United States Patent
Khalid et al.

(10) Patent No.: US 10,810,791 B2
(45) Date of Patent: Oct. 20, 2020

(54) METHODS AND SYSTEMS FOR DISTINGUISHING OBJECTS IN A NATURAL SETTING TO CREATE AN INDIVIDUALLY-MANIPULABLE VOLUMETRIC MODEL OF AN OBJECT

(71) Applicant: Verizon Patent and Licensing Inc., Arlington, VA (US)

(72) Inventors: Mohammad Raheel Khalid, Budd Lake, NJ (US); Ali Jaafar, Morristown, NJ (US); Denny Breitenfeld, Florham Park, NJ (US); Xavier Hansen, Parsippany, NJ (US); Christian Egeler, Basking Ridge, NJ (US); Syed Kamal, Raritan, NJ (US); Lama Hewage Ravi Prathapa Chandrasiri, Princeton Junction, NJ (US); Steven L. Smith, Putnam Valley, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/234,448

(22) Filed: Dec. 27, 2018

(65) Prior Publication Data
US 2019/0156565 A1 May 23, 2019

Related U.S. Application Data

(63) Continuation of application No. 15/141,717, filed on Apr. 28, 2016, now Pat. No. 10,204,444.

(51) Int. Cl.
*G06T 17/00* (2006.01)
*G06F 3/01* (2006.01)

(52) U.S. Cl.
CPC .............. *G06T 17/00* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 5,841,439 | A * | 11/1998 | Pose | G06T 15/005 345/418 |
| 6,181,354 | B1 * | 1/2001 | Swan | G09G 3/003 345/571 |
| 6,208,347 | B1 * | 3/2001 | Migdal | G06T 17/20 345/419 |

(Continued)

*Primary Examiner* — Phong X Nguyen

(57) ABSTRACT

An exemplary virtual reality media provider system receives two-dimensional ("2D") video data for surfaces of first and second objects located in a natural setting. The 2D video data is captured by first and second capture devices disposed at different positions with respect to the objects. The system distinguishes the first object from the second object by performing a plurality of techniques in combination with one another. The plurality of techniques include determining that the first object is moving in relation to the second object; and determining that, from a vantage point of at least one of the different positions, a representation of the first object captured within the 2D video data does not overlap with a representation of the second object. Based on the received 2D video data and the distinguishing of the first and second objects, the system generates an individually-manipulable volumetric model of the first object.

20 Claims, 12 Drawing Sheets

(56) References Cited

U.S. PATENT DOCUMENTS

| | | | |
|---|---|---|---|
| 6,359,619 B1* | 3/2002 | Waters | G06T 15/80 |
| | | | 345/426 |
| 6,798,834 B1 | 9/2004 | Murakami et al. | |
| 8,016,653 B2 | 9/2011 | Pendleton et al. | |
| 8,243,122 B2* | 8/2012 | Ishikawa | G06T 15/205 |
| | | | 348/39 |
| 8,355,532 B2 | 1/2013 | Gillard et al. | |
| 8,396,127 B1* | 3/2013 | Bultje | H04N 19/119 |
| | | | 375/240.13 |
| 9,117,310 B2* | 8/2015 | Coene | G06T 15/205 |
| 9,141,852 B1* | 9/2015 | Cosgun | G06K 9/00335 |
| 9,330,470 B2* | 5/2016 | Kutliroff | G06T 7/251 |
| 9,961,330 B2* | 5/2018 | Park | G06T 7/11 |
| 10,084,994 B2* | 9/2018 | Halamish | H04N 13/156 |
| 10,165,157 B2* | 12/2018 | Carr | H04N 5/222 |
| 2003/0169340 A1 | 9/2003 | Kamijo et al. | |
| 2004/0104935 A1 | 6/2004 | Williamson et al. | |
| 2006/0279630 A1 | 12/2006 | Aggarwal et al. | |
| 2007/0260567 A1* | 11/2007 | Funge | G06N 20/00 |
| | | | 706/47 |
| 2007/0279494 A1 | 12/2007 | Aman et al. | |
| 2009/0129630 A1* | 5/2009 | Gloudemans | G06T 15/20 |
| | | | 382/103 |
| 2009/0315978 A1* | 12/2009 | Wurmlin | G06T 5/005 |
| | | | 348/43 |
| 2010/0309222 A1* | 12/2010 | Feyereisen | G01S 13/867 |
| | | | 345/629 |
| 2011/0227938 A1* | 9/2011 | Lan | G06T 15/005 |
| | | | 345/581 |
| 2011/0296324 A1* | 12/2011 | Goossens | G06Q 10/10 |
| | | | 715/763 |
| 2012/0020515 A1 | 1/2012 | Robinson | |
| 2012/0120201 A1* | 5/2012 | Ward | A63F 13/213 |
| | | | 348/47 |
| 2013/0036372 A1* | 2/2013 | Priebe | G06F 3/0481 |
| | | | 715/757 |
| 2013/0093788 A1 | 4/2013 | Liu et al. | |
| 2013/0100132 A1 | 4/2013 | Katayama et al. | |
| 2013/0117377 A1* | 5/2013 | Miller | G06T 19/006 |
| | | | 709/205 |
| 2013/0136307 A1 | 5/2013 | Yu et al. | |
| 2013/0150160 A1 | 6/2013 | El Dokor et al. | |
| 2013/0215229 A1* | 8/2013 | Yerli | G06T 13/20 |
| | | | 348/46 |
| 2013/0222369 A1 | 8/2013 | Huston et al. | |
| 2013/0226528 A1* | 8/2013 | Hodgins | G06T 17/00 |
| | | | 703/1 |
| 2013/0249948 A1 | 9/2013 | Reitan | |
| 2015/0002636 A1* | 1/2015 | Brown | H04N 13/254 |
| | | | 348/47 |
| 2015/0178988 A1 | 6/2015 | Montserrat et al. | |
| 2015/0206335 A1* | 7/2015 | Hugel | A63F 13/25 |
| | | | 345/419 |
| 2015/0262420 A1* | 9/2015 | Arun | G06F 9/5066 |
| | | | 345/420 |
| 2016/0012633 A1* | 1/2016 | Wei | G06T 7/593 |
| | | | 345/420 |
| 2016/0189421 A1* | 6/2016 | Haimovitch-Yogev | H04N 21/21805 |
| | | | 345/626 |
| 2016/0212409 A1 | 7/2016 | Cole et al. | |
| 2016/0261855 A1* | 9/2016 | Park | G06T 7/11 |
| 2016/0307032 A1* | 10/2016 | Butler | G06K 9/00375 |
| 2017/0046865 A1* | 2/2017 | Cantwell | G06T 7/292 |
| 2017/0094326 A1* | 3/2017 | Arimilli | H04N 21/816 |
| 2017/0264890 A1* | 9/2017 | Gorilovsky | B66B 13/303 |

* cited by examiner

US 10,810,791 B2

METHODS AND SYSTEMS FOR DISTINGUISHING OBJECTS IN A NATURAL SETTING TO CREATE AN INDIVIDUALLY-MANIPULABLE VOLUMETRIC MODEL OF AN OBJECT

RELATED APPLICATIONS

This application is a continuation application of U.S. patent application Ser. No. 15/141,717, filed Apr. 28, 2016, and entitled "Methods and Systems for Creating and Manipulating an Individually-Manipulable Volumetric Model of an Object," which is hereby incorporated by reference in its entirety.

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world from a particular viewpoint (e.g., vantage point) within the immersive virtual reality world.

In some examples, a virtual reality media provider may provide virtual reality media content that includes an immersive virtual reality world representative of real-world objects and scenery (i.e., as opposed to computer-generated, animated, or other virtual objects and scenery). For example, the immersive virtual reality world may represent a real-world event (e.g., a sporting event, a concert, etc.) that may be taking place in real time (e.g., a live event), a fiction or non-fiction live-action program (e.g., a virtual reality television show, movie, documentary, etc.), or another type of program involving real-world objects and scenery.

Traditionally, immersive virtual reality worlds based on real-world objects and scenery are "flat" in the sense that all the real-world objects and/or scenery of the immersive virtual reality world are represented within virtual reality media content in the aggregate, as a flat conglomerate scene as viewed by a person standing at a fixed spot in the real world. This may be true even in cases where stereoscopically different versions of the flat conglomerate scene may be presented to each eye of a user experiencing the immersive virtual reality world to give the scene a three-dimensional appearance. As a result, the immersive virtual reality world may look realistic to the user from the particular viewpoint of the user, but there may be significant limitations placed on specific objects included in the flat conglomerate scene as to how the specific objects may be presented, manipulated, modified, and so forth with respect to other objects included in the flat conglomerate scene and with respect to the immersive virtual reality world in general.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
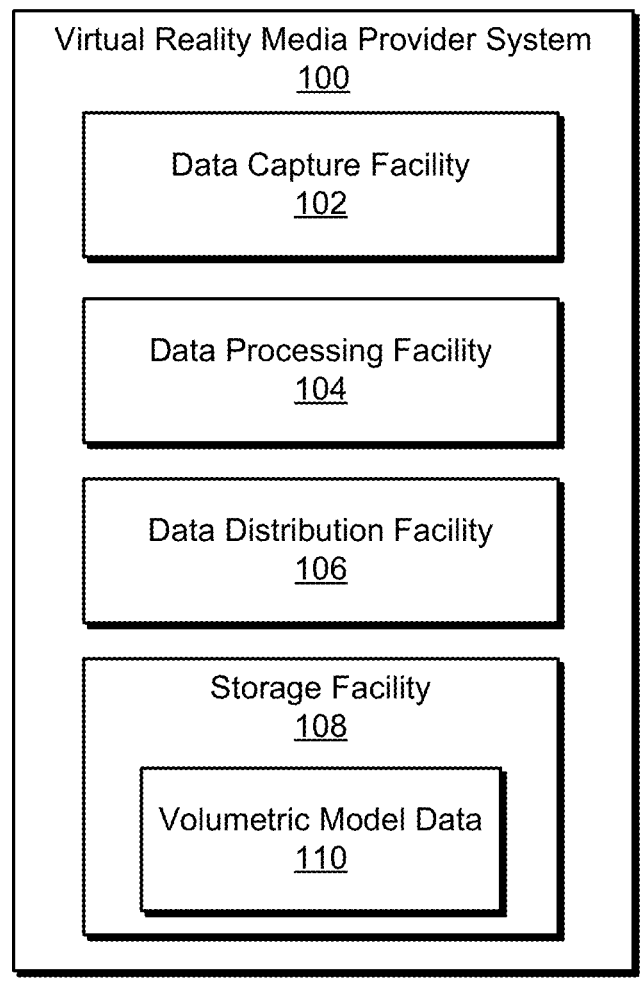
FIG. 1 illustrates an exemplary virtual reality media provider system that may create and manipulate an individually-manipulable volumetric model of an object located in a natural setting according to principles described herein.

Methods and systems for creating and manipulating an individually-manipulable volumetric model of an object (e.g., a real-world object) are described herein. Individually-manipulable volumetric models of objects may be useful for many purposes, particularly when the individually-manipulable volumetric models may be created from objects located in a natural setting (e.g., as opposed to a studio setting with a "green screen"). For example, virtual reality media content that is based on individually-manipulable volumetric models of real-world objects rather than on a flat conglomerate scene representative of objects and scenery as they appear from one particular viewpoint, as described above, may allow for arbitrary manipulation of the real-world objects in relation to one another and to an immersive virtual reality world in general. Specifically, as will be described in more detail below, individually-manipulable volumetric models of objects may be arbitrarily added to immersive virtual reality worlds, removed from immersive virtual reality worlds, replaced (i.e., swapped out with different objects) within immersive virtual reality worlds, viewed from arbitrary points of view within immersive virtual reality worlds, and so forth.

To this end, a virtual reality media provider system may include a configuration of synchronous video and depth capture devices (e.g., video cameras, three-dimensional ("3D") depth scanning hardware, etc.) disposed at fixed positions in a vicinity (e.g., within a line of sight) of a first object. In some examples, the first object may be located in a natural setting along with one or more additional objects.

As used herein, a "natural setting" broadly includes any setting that is not used to specifically create a volumetric model of an object. In other words, natural settings may include various types of settings (e.g., indoor settings, outdoor settings, artificially-created settings, nature-created settings, etc.) in which an object may be located (e.g., along with other objects) for purposes other than for creating a volumetric model of the object. For example, a studio setting in which an object is positioned in front of a "green screen" or other similar backdrop in order to scan the object and create a volumetric model of the object may not be considered a natural setting, while an artificially-created set of a motion picture where people and objects interact while being filmed for a motion picture may be considered a natural setting.

In certain examples, natural settings may be associated with real-world events (i.e., events that take place in the real-world, as opposed to taking place only in a virtual world). For example, a real-world event may be a sporting event (e.g., a basketball game, an Olympic event, etc.), a concert (e.g., a rock concert in a large venue, a classical chamber concert in an intimate venue, etc.), a theatrical presentation (e.g., a Broadway musical, an outdoor pageant, etc.), a large-scale celebration (e.g., New Year's Eve on Times Square, Mardis Gras, etc.), a race (e.g., a stock-car race, a horse race, etc.), a political event (e.g., a presidential debate, a political convention, etc.), or any other real-world event that may interest potential viewers. The real-world event may take place at any indoor or outdoor real-world location.

The configuration of synchronous video and depth capture devices disposed at the fixed positions in the vicinity of the first object (e.g., within a natural setting) may be configured to capture two-dimensional ("2D") video data and depth data for a surface of the first object while the first object is located in the natural setting along with the one or more additional objects. As used herein, "2D video data" may broadly include any data representative of how a real-world subject (e.g., a real-world scene, one or more objects within a natural setting, etc.) may appear over a particular time period and from at least one vantage point of at least one device capturing the 2D video data. 2D video data is not limited to any particular format, file type, frame rate, resolution, quality level, or other characteristic that may be associated with various definitions and/or standards defining video in the art. In certain examples, 2D video data may include a captured sequence of images (e.g., high-resolution still images) representative of an object within a natural setting over a particular time period. As used herein, "depth data" may broadly include any data representative of a position of a real-world subject (e.g., one or more objects within a natural setting) in 3D space. As will be described in more detail below, depth data may be captured based solely on 2D video data (e.g., by combining 2D video data captured from different vantage points using a suitable depth capture technique) or by using techniques that may require additional depth capture equipment and/or data such as specialized depth capture devices that provide time-of-flight data, infrared imaging data, and the like. In certain examples, 2D video data may be synchronized with depth data such that individually-manipulable volumetric models of objects that incorporate the 2D video data and the depth data across a period of time may be generated.

Accordingly, video and depth capture devices may capture 2D video data and depth data in any suitable way and using any suitable devices as may serve a particular implementation. Specifically, as will be described in more detail below, in certain examples, video and depth capture device may consist of video cameras or other types of image capture devices that may capture 2D video data of objects within a natural setting from multiple vantage points from which depth data for the surfaces of the objects may be captured (e.g., derived) by using one or more depth capture techniques (e.g., triangulation-based depth capture techniques) described herein. In other examples, as will also be described in more detail below, video and depth capture devices may include video cameras or other types of image capture devices configured to capture the 2D video data, as well as separate depth capture devices configured to capture the depths of the surface of the objects using one or more of the depth capture techniques described below (e.g., time-of-flight-based depth capture techniques, infrared-based depth capture techniques, etc.). In the same or other examples, video and depth capture devices may include unitary devices that include video camera devices and specialized depth capture devices combined together in single devices that are similarly configured to capture the depth data using one or more depth capture techniques described here. Additionally, the configuration of synchronous video and depth capture devices may continuously capture the 2D video data and the depth data in time, such that the first object may be modeled in all four dimensions of space and time.

As used herein, an "object" may broadly include anything that is visible (i.e., non-transparent) from a particular viewpoint, whether living or inanimate. For example, as will be described below, if the setting is a real-world event such as a basketball game, the first object for whose surface the video and depth capture devices may capture 2D video data and depth data may be a basketball being used for the game, while the additional objects included in the natural setting with the basketball may include objects such as a basketball court, a basketball standard (e.g., backboard, rim, net, etc.), a player or referee participating in the game, and/or other objects associated with the basketball game.

In some examples, the video and depth capture devices may capture the 2D video data and depth data in real-time (e.g., as the basketball game is being played) so that virtual reality media content representative of the real-world event (e.g., the basketball game) may be distributed to users to experience live, as will be described below.

Based on the captured depth data and the captured 2D video data from the video and depth capture devices, the virtual reality media provider system may distinguish the first object from a second object included in the one or more additional objects located in the natural setting along with the first object. For instance, in the basketball game example described above, the virtual reality media provider system may distinguish a basketball from a player holding the basketball. Techniques for distinguishing objects from other objects will be described below.

Also based on the captured depth data and the captured 2D video data from the video and depth capture devices, the virtual reality media provider system may generate an individually-manipulable volumetric model of the first object. An individually-manipulable volumetric model of an object may include and/or be generated based both on 1) depth data representing where and how the object is positioned in 3D space at a particular time, or with respect to time over a particular time period, and on 2) synchronous 2D video data mapped onto a positional model (e.g., a wireframe model of the object derived from the depth data) to represent how the object appeared at the particular time or with respect to time over the particular time period. As such, individually-manipulable volumetric models may be 3D models including three spatial dimensions or four-dimensional ("4D") models that include the three spatial dimensions as well as a temporal dimension. Additionally, the individually-manipulable volumetric model of the first object may be configured to be individually manipulated with respect to an immersive virtual reality world while a user of a media player device is experiencing the immersive virtual reality world using the media player device. For example, the immersive virtual reality world may be based on virtual reality media content provided to the media player device and representative of the immersive virtual reality world.

More specifically, as will be described below, one or more individually-manipulable volumetric models of objects within the natural setting may be combined into a volumetric data stream (e.g., a real-time volumetric data stream) from which virtual reality media content may be generated. In some examples, the generation of the volumetric data stream may be performed in real time such that users not physically present in the natural setting (e.g., not attending a real-world event such as a basketball game, not physically on location at a scene where news coverage is taking place, etc.) may be able to experience what is happening in the natural setting and the actions of the objects within the natural setting live, in real time, via virtual reality media content corresponding to the natural setting. Examples of individually-manipulable volumetric models of objects within natural settings, as well as volumetric data streams and techniques for creating and distributing individually-manipulable volumetric models and volumetric data streams will be described below.

Virtual reality media content representative of an immersive virtual reality world may be generated and/or provided to a media player device associated with a user. For example, as will be described below, the virtual reality media content may be generated from data within a volumetric data stream that includes individually-manipulable volumetric models of objects. The virtual reality media content may be generated and/or provided by the virtual reality media provider system and/or by another system operated by the virtual reality media provider or by a separate entity (e.g., a virtual reality media content distributor associated with the virtual reality media provider). While the user is experiencing the immersive virtual reality world provided within the virtual reality media content using the media player device, the individually-manipulable volumetric model of the first object and/or individually-manipulable volumetric models of other objects represented in the immersive virtual reality world may be individually manipulated with respect to one another and/or with respect to the immersive virtual reality world in general. For example, the individually-manipulable volumetric models may be individually manipulated by a system generating and/or providing the virtual reality media content (e.g., the virtual reality media provider system, a virtual reality media content distributor system, etc.), by the media player device presenting the virtual reality media content, or by any other system as may serve a particular implementation.

As used herein, individually-manipulable volumetric models of objects may each be "individually manipulated" with respect to each other and/or with respect to an immersive virtual reality world by being processed (e.g., added, removed, modified, moved, replaced, rotated, graphically altered, etc.) as a discrete unit independent of other individually-manipulable volumetric models of other objects in the immersive virtual reality world and/or independently of the immersive virtual reality world in general. For example, as described below, the virtual reality media provider system may individually manipulate an individually-manipulable volumetric model of an object within an immersive virtual reality world by inserting the individually-manipulable volumetric model into the immersive virtual reality world (e.g., at any location within the immersive virtual reality world), removing the individually-manipulable volumetric model from the immersive virtual reality world, replacing (e.g., swapping out) the individually-manipulable volumetric model with a different individually-manipulable volumetric model in the immersive virtual reality world, replacing (e.g., swapping out) a different individually-manipulable volumetric model of a different object with the individually-manipulable volumetric model in the immersive virtual reality world, modifying (e.g., rotating, resizing, recoloring, shading, moving, etc.) the individually-manipulable volumetric model in the immersive virtual reality world to make the individually-manipulable volumetric model appear different or to be viewed from a different viewpoint, or by otherwise manipulating the individually-manipulable volumetric model in the immersive virtual reality world as may serve a particular implementation.

In some examples, such as when the natural setting is associated with a real-world event, it may be desirable for the users who are not attending the real-world event to experience the real-world event live (e.g., in real time as the real-world event is occurring with as small a delay as possible). Accordingly, the virtual reality media provider system may provide virtual reality media content representative of an immersive virtual reality world corresponding to the real-world event to media player devices in real time. Additionally or alternatively, the virtual reality media provider system may provide the virtual reality media content representative of an immersive virtual reality world corresponding to a real-world event to media player devices in a time-shifted manner.

While data processing and data distribution may take a finite amount of time such that it is impossible for a user to experience real-world events precisely as the real-world events occur, as used herein, an operation (e.g., providing the virtual reality media content) is considered to be performed "in real time" when the operation is performed immediately and without undue delay. Accordingly, a user may be said to experience a real-world event in real time even if the user experiences particular occurrences within the event (e.g., a particular shot in a basketball game) a few seconds or minutes after the occurrences actually take place at the real-world event. Certain methods and systems disclosed herein may be specially adapted to support real-time volumetric modeling and experiencing of immersive virtual reality worlds based on the natural setting. For example, powerful hardware resources (e.g., multiple servers including multiple processing units) may be employed to perform the immense processing required for real-time creation and distribution of immersive virtual reality worlds based on individually-manipulable volumetric models. Moreover, particular techniques for capturing 2D video data and depth data (e.g., such as techniques described below) or for distinguishing and separately modeling different types of objects (e.g., static, dynamic, and background objects as described below) may further facilitate and/or enable the immense processing to be performed in real-time.

By creating and manipulating an individually-manipulable volumetric model of an object located in a natural setting, immersive virtual reality worlds based on real-world objects may be generated that are not "flat" (e.g., as in the flat conglomerate scenes described above), but that are instead dynamic and manipulable on an object-by-object basis. As a result, specific objects represented in the immersive virtual reality world may be freely and independently manipulated, even in real time, as may be directed by a user experiencing the immersive virtual reality world, or as directed by virtual reality content creators (e.g., directors and/or producers of virtual reality media content programs) associated with the virtual reality media provider system. For example, a scene in a virtual reality television show that includes a vending machine associated with a first brand of soft drink may be replaced in the scene by a vending machine associated with a second brand of soft drink (e.g., according to which brand may be commercially sponsoring the virtual reality television show).

Similarly, in certain examples, this concept may even be applied to objects that are moving and/or performing actions. For example, a first actor in a virtual reality motion picture may be replaced by a second actor in the virtual reality motion picture. Because the behavior of the first actor (e.g., one or more actions performed by the first actor) may be captured and associated with (e.g., stored along with) the individually-manipulable volumetric model of the first actor, the second actor may be made to behave in the same way as the first actor (e.g., to perform the same one or more actions) in the virtual reality motion picture without any need for the second actor to actually perform the one or more actions. For example, the individually-manipulable volumetric model of the second actor may be manipulated to behave in the same fashion as the individually-manipulable volumetric model of the first actor based on the captured behavior of the first actor even if the second actor has never performed the one or more actions of the first actor. Moreover, objects may be added to a scene (e.g., adding a passenger to a seat of a car that would otherwise be empty), removed from a scene, or otherwise manipulated as may serve a particular implementation.

Additionally, by generating individually-manipulable volumetric models for all the objects in a particular natural setting, the individually-manipulable volumetric models may be presented in an immersive virtual reality world that may be viewed from a dynamically selectable viewpoint corresponding to an arbitrary location in the vicinity of the natural setting. For example, the dynamically selectable viewpoint may be selected by the user of the media player device while the user is experiencing the real-world event using the media player device.

As used herein, an "arbitrary location" may refer to any point in space in a vicinity of one or more objects for which individually-manipulable volumetric models have been generated (e.g., in or around the natural setting). For example, arbitrary locations are not limited to fixed positions where video and depth capture devices may be disposed, but also include all the positions between the video and depth capture devices and even places where video and depth capture devices may not be able to be positioned. Moreover, arbitrary locations may not be limited to aligning with a viewing angle (i.e., an angle of capture) of any video and depth capture device in the configuration of synchronous video and depth capture device in the vicinity of the objects.

In some examples, such arbitrary locations (i.e., that do not directly align with a viewing angle of any video and depth capture device) may correspond to desirable viewpoints where cameras may not be able to be positioned. For instance, in the basketball game example presented above, video and depth capture devices may not be allowed to be positioned in the middle of the basketball court because the video and depth capture devices would interfere with gameplay of the basketball game. However, if individually-manipulable volumetric models of the objects on and around the basketball court have been generated, a user may dynamically select viewpoints from which to experience the game that are in any arbitrary location on the basketball court. For example, the user may dynamically select his or her viewpoint to follow the basketball up and down the basketball court and experience the basketball game as if standing on the basketball court in the middle of the action of the game. In other words, for example, while video and depth capture devices may be positioned at fixed positions surrounding the basketball court, but may not be positioned directly on the court so as not to interfere with gameplay of the basketball game, the user may dynamically select viewpoints from which to experience the game that are in any arbitrary location on the basketball court.

By creating and manipulating an individually-manipulable volumetric model of an object located in a natural setting that allows objects to be individually manipulated as described herein, a virtual reality media provider system may provide users with greater flexibility for tailoring virtual reality media content programs to their preferences (e.g., allowing users to select favorite actors and/or objects (e.g., cars, etc.) to be presented within particular scenes), and may provide more tailored and natural product placement advertising for sponsors. Moreover, the virtual reality media provider system may facilitate users becoming immersed in natural settings (e.g., real-world events, etc.) to an extent that may not be possible for people experiencing the natural settings using traditional media (e.g., television), traditional virtual reality media, or even by being physically present in the natural setting. For example, based on a particular manipulation of several individually-manipulable volumetric models of objects, a user may be able to experience a live basketball game as if running up and down the court with the players, or experience a live concert as if standing on stage next to the performers.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality media provider system 100 ("system 100") that may create and manipulate an individually-manipulable volumetric model of an object located in a natural setting in accordance with principles described herein. As shown, system 100 may include, without limitation, a data capture facility 102, a data processing facility 104, a data distribution facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. Each of facilities 102 through 108 may include or be housed in a device (e.g., having a single chassis) and located at a single location or distributed between multiple devices and/or multiple locations as may serve a particular implementation. Each of facilities 102 through 108 will now be described in more detail.

Data capture facility 102 may include any hardware and/or software (e.g., computing systems, video and depth capture equipment, software programs, etc.) used for capturing data associated with attributes of objects in a natural setting. For example, data capture facility 102 may include a configuration of synchronous video and depth capture devices such as 2D video cameras, 3D depth scanners, unitary devices (e.g., combination video-depth capture devices configured to capture both 2D video and associated depth data), and so forth. Examples of video and depth capture devices will be described in more detail below. Data capture facility 102 may be used to capture two-dimensional video data and depth data for surfaces of objects in a natural setting in any way described herein and/or as may serve a particular implementation.

Data processing facility 104 may include any hardware and/or software (e.g., computing systems, software programs, etc.) used for processing the data captured by data capture facility 102, for distinguishing one object from another in the captured 2D video data and captured depth data, and/or for generating individually-manipulable volumetric models of one or more objects in the natural setting. For example, data processing facility 104 may include one or more server systems or other computing devices running specialized and/or general-purpose image processing software, 3D modeling software, and so forth. Examples of how data processing facility 104 may process captured data to distinguish a first object from a second object included in one or more additional objects located in the natural setting along with the first object and to generate an individually-manipulable volumetric model of the first object will be described below. Data processing facility 104 may also generate virtual reality media content representative of an immersive virtual reality world corresponding to the natural setting based on the individually-manipulable volumetric model.

Data distribution facility 106 may include any hardware and/or software (e.g., computing systems, networking systems, software programs, etc.) used for distributing data processed (e.g., generated) by data processing facility 104 and/or for providing virtual reality media content representative of the real-world event (e.g., virtual reality media content generated by data processing facility 104) as experienced from a dynamically selectable viewpoint corresponding to an arbitrary location at the real-world event. To this end, data distribution facility 106 may also receive data representative of user input (e.g., selections of dynamically selectable viewpoints corresponding to arbitrary locations at the real-world event) from users experiencing the real-world event using media player devices to present the virtual reality media content.

Storage facility 108 may maintain volumetric model data 110 and/or any other data received, generated, managed, maintained, used, and/or transmitted by facilities 102 through 106. Volumetric model data 110 may include data representing individually-manipulable volumetric models (e.g., 3D models, 4D models, etc.) of various objects within the natural setting generated by data processing facility 104 from 2D video data and/or depth data captured by data capture facility 102. As such, system 100 may provide virtual reality media content representative of an immersive virtual reality world corresponding to the natural setting in which the objects within the natural setting may be manipulated in various ways described herein (e.g., replacing, modifying, adding, or removing objects within the immersive virtual reality world, etc.). Additionally, system 100 may provide virtual reality media content representative of an immersive virtual reality world corresponding to the natural setting as viewed from a dynamically selectable viewpoint corresponding to an arbitrary location in the vicinity of the natural setting by manipulating and providing various individually-manipulable volumetric models within volumetric model data 110 to different media player devices based on dynamically selectable viewpoints that are selected by different respective users of the media player devices. Storage facility 108 may further include any other data as may be used by facilities 102 through 106 to create and manipulate individually-manipulable volumetric models of objects located in a natural setting as may serve a particular implementation.

In some implementations, system 100 may perform some or all of the operations for creating and manipulating an individually-manipulable volumetric model of an object located in a natural setting in real time. For example, system 100 may capture the two-dimensional video data and depth data for the surface of a first object, distinguish the first object from a second object, generate an individually-manipulable volumetric model of the first object, and individually manipulate the individually-manipulable volumetric model of the first object with respect to an immersive virtual reality world represented in virtual reality media content in real time while the first object is located in the natural setting.

Figure 2:
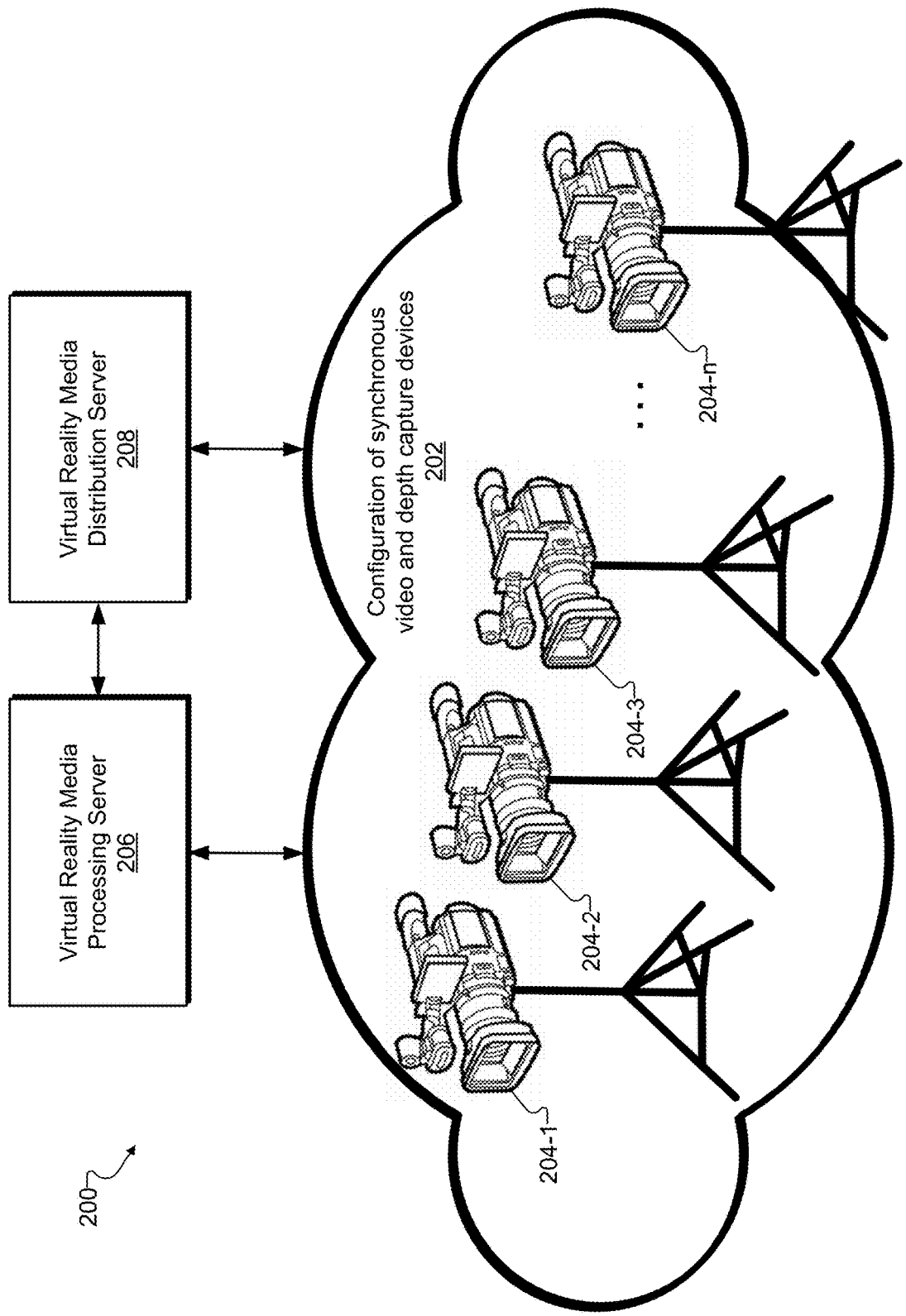
FIG. 2 illustrates an exemplary implementation of the virtual reality media provider system of FIG. 1 according to principles described herein.

FIG. 2 illustrates an exemplary implementation 200 of system 100 shown in FIG. 1. As shown, implementation 200 includes a configuration 202 of synchronous video and depth capture devices 204 (e.g., video and depth capture devices 204-1 through 204-n). Implementation 200 further includes a virtual reality media processing server 206 and a virtual reality media distribution server 208 communicatively coupled to configuration 202.

In configuration 202, synchronous video and depth capture devices 204 ("capture devices 204") may be disposed (i.e. located, installed, etc.) at fixed positions in a vicinity of a first object in any way that may serve a particular implementation. For example, as will be illustrated and described below, configuration 202 may include capture devices 204 at fixed positions surrounding the first object in the natural setting. For instance, in the basketball game example described above, capture devices 204 may surround objects on a field of play (e.g., a basketball court) at a sporting event (e.g., the basketball game). Similarly, capture devices 204 may surround a stage of a theatrical performance being performed, a set of a movie or television program being filmed, or any other natural setting or one or more portions thereof as may serve a particular implementation.

Each capture device 204 may include one or more devices or components configured to continuously capture 2D video and/or depth data as may serve a particular implementation. For example, each capture device 204 may include a first component (e.g., a video camera device) configured to capture 2D video of objects at which the first component is directed (e.g., pointed), and a second component (e.g., a depth camera device, a 3D imaging or 3D scanning device, etc.) configured to capture depth data of objects at which the second component is directed. Is this example, the first component and the second component may be separate or discrete devices, but may be communicatively coupled and configured to work in conjunction with one another to simultaneously and synchronously capture both the 2D video data and the depth data.

In other examples, each capture device 204 may comprise a unitary video-depth capture device (e.g., a specially-designed video camera) that is configured to capture both the 2D video data and the depth data. In other words, both the 2D video data and the depth data may be captured using the same unitary video-depth capture device. The unitary video-depth capture device may be a commercially available or specially-designed video camera capable of not only capturing video data but also detecting corresponding depth of objects represented in the video data using one of the depth capture techniques described herein or another suitable technique. Similarly, as mentioned above, in examples where a depth capture technique being used relies only on 2D video data (e.g., certain triangulation-based depth capture techniques), capture devices 204 may not include any specialize depth capture equipment or capability (e.g., time-of-flight equipment, infrared sensing equipment, etc.) but, rather, may only include video capture devices and/or other similar types of image capture devices.

In some examples, capture devices 204 may have a limited viewing angle (e.g., 90 degrees, 120 degrees, etc.) designed to capture data from objects in a specific area of the natural setting. For example, a ring configuration of capture devices 204 with limited viewing angles may surround objects within a natural setting or one or more portions thereof (e.g., objects on a basketball court at a basketball game, cars at different turns on a racetrack, etc.) and may be pointed inwardly to capture data associated with the objects (e.g., positioned around the basketball court or the different turns of the racetrack, and pointing inwardly to the basketball court or to the different turns of the racetrack, etc.). In the same or other examples, at least one particular capture device 204 may have a 360-degree viewing angle to capture data from objects surrounding the particular capture device 204. For example, at least one of capture devices 204 may be a 360-degree camera configured to capture and/or generate a 360-degree video image of the natural setting around a center point corresponding to the 360-degree camera.

As used herein, a 360-degree video image is any video image that depicts the surroundings of a center point (e.g., a center point associated with the location of one of capture devices 204 such as a 360-degree camera) on all sides along at least one dimension. For example, one type of 360-degree video image may include a panoramic video image that depicts a complete 360-degree by 45-degree ring around a center point corresponding to the camera. Another type of 360-degree video image may include a spherical video image that depicts not only the ring around the center point, but an entire 360-degree by 180-degree sphere surrounding the center point on all sides. In certain examples, a 360-degree video image may be based on a non-circular geometric structure. For example, certain 360-degree video images may be based on cubes, rectangular prisms, pyramids, and/or other geometric structures that may serve a particular implementation, rather than being based on spheres.

The 360-degree camera may be configured to capture a very wide-angle video image (e.g., using one or more "fish-eye" lenses to capture a spherical or semi-spherical image) or to capture a plurality of raw video images from each of a plurality of segment capture cameras built into or otherwise associated with the 360-degree camera. In some examples, the 360-degree camera may generate the 360-degree video image of the natural setting by combining (e.g., stitching together) the plurality of video images captured by the segment capture cameras. In other examples, the 360-degree camera may send raw video image data to one or more servers (e.g., virtual reality media processing server 206) and the raw video images may be combined into a 360-degree (e.g., spherical) video image by the one or more servers.

Capture devices 204 within configuration 202 may be communicatively coupled to one another (e.g., networked together) and/or communicatively coupled to another device (e.g., virtual reality media processing server 206). This may allow the devices to maintain synchronicity in time, position, angle, etc. so that individually-manipulable volumetric models of the objects in the natural setting may be properly generated. For example, capture devices 204 may send and receive timing signals to ensure that each of capture device 204 captures corresponding data at the same time and that the data captured by different capture devices 204 may be timestamped with a universal time shared by all of capture devices 204 in configuration 202.

Virtual reality media processing server 206 may perform any of the data processing operations described herein. For example, virtual reality media processing server 206 may be associated with (e.g., may implement all or a portion of or may be contained within) data processing facility 104 and/or storage facility 108 of system 100. As such, virtual reality media processing server 206 may receive captured data from configuration 202 of capture devices 204 and may use the captured data to distinguish a first object from a second object located in the natural setting and generate an individually-manipulable volumetric model of the first object and/or the second object in any way that may serve a particular implementation.

Virtual reality media distribution server 208 may perform any of the data distribution operations described herein. For example, virtual reality media distribution server 208 may be associated with (e.g., implementing all or a portion of, or being contained within) data distribution facility 106 and/or storage facility 108 of system 100. As such, virtual reality media distribution server 208 may receive captured data from configuration 202 and/or processed data (e.g., the individually-manipulable volumetric model of the objects and/or virtual reality media content that includes the individually-manipulable volumetric models) from virtual reality media processing server 206, and may distribute the captured and/or processed data to other devices. For example, virtual reality media distribution server 208 may provide virtual reality media content representative of the natural setting (e.g., based on and/or including one or more individually-manipulable volumetric models of objects within the natural setting) to media player devices associated with users (not explicitly shown in FIG. 2).

Figure 3:
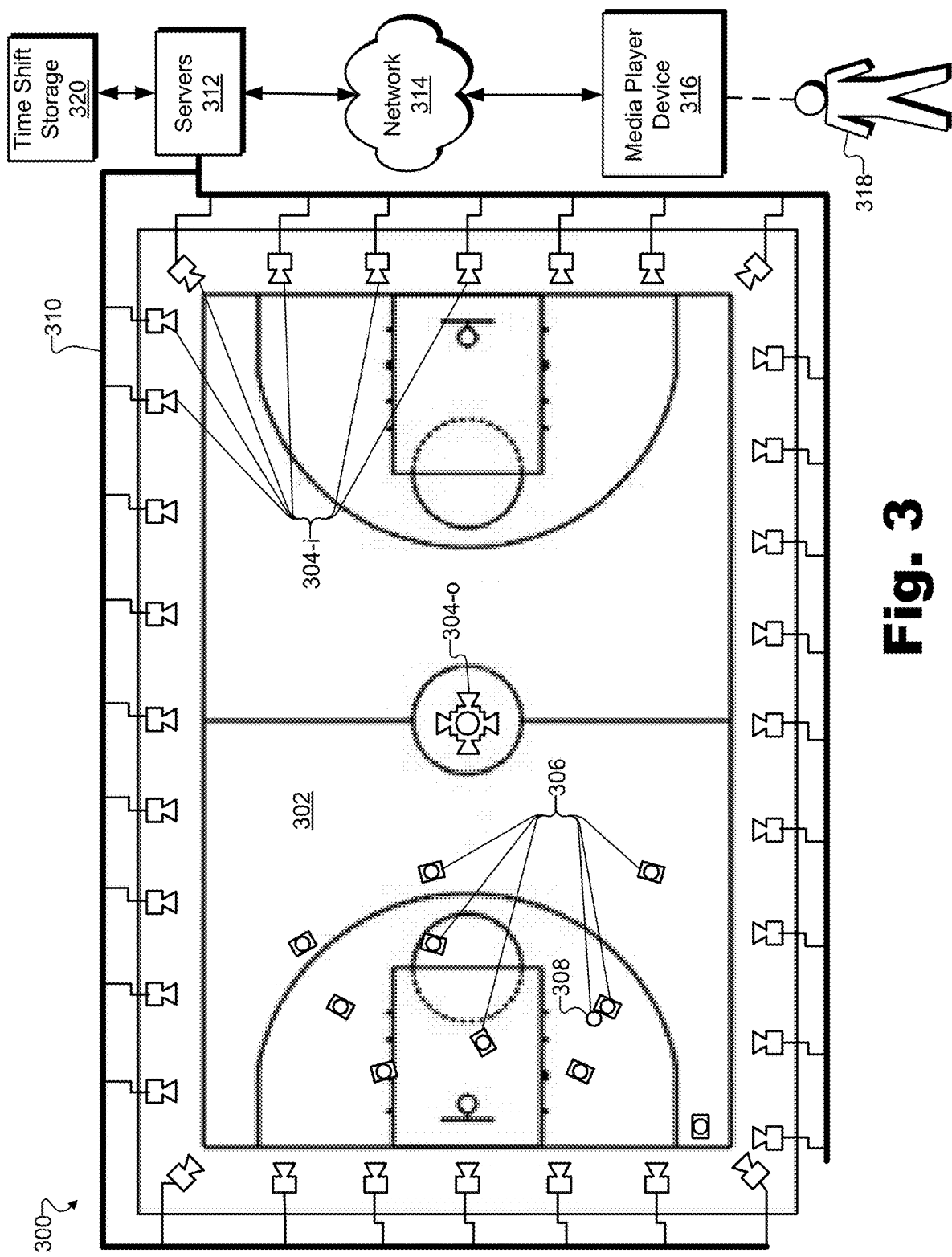
FIG. 3 illustrates an exemplary configuration in which the virtual reality media provider system of FIG. 1 operates to create and manipulate an individually-manipulable volumetric model of an object located in a natural setting according to principles described herein.

FIG. 3 illustrates an exemplary configuration 300 in which system 100 operates to create and manipulate an individually-manipulable volumetric model of an object located in a natural setting. As illustrated in the example of FIG. 3, a natural setting may be a setting of a real-world event such as a basketball game. More specifically, as shown in configuration 300, the natural setting may include a stage space 302 of the real-world event (e.g., a basketball court), which may be surrounded by inward-facing synchronous video and depth capture devices 304-*i* and may surround at least one outward-facing video and depth capture device 304-*o* (collectively referred to as "capture devices 304"). Capture devices 304 may be configured to capture 2D video data and depth data for surfaces of objects 306 within the natural setting (e.g., players, the basketball, etc.). In some examples, capture devices 304 capture 2D video data and depth data for the surfaces of objects 306 in real time. Basketball 308 is specifically called out in configuration 300 as a particular example of an object 306 because a detailed example of creating an individually-manipulable volumetric model will be provided below with respect to basketball 308.

As further shown in configuration 300, capture devices 304 may be communicatively coupled by cables 310 and/or by other means (e.g., wireless networking means) to one another and/or to one or more servers 312 (e.g., real-time servers processing captured data representative of the real-world event of the basketball game in real time). Servers 312, in turn, are communicatively coupled by a network 314 to one or more media player devices associated with one or more respective users, including a media player device 316 associated with a user 318. As shown, servers 312 may also be communicatively coupled to a time-shift storage 320. Certain components in configuration 300 will now be described in more detail.

Stage space 302 may include any portion of a natural setting (e.g., the real-world event of the basketball game) that is targeted by a virtual reality media provider as being of interest to potential virtual reality viewers (e.g., such as user 318). For example, if, as in the example of FIG. 3, the natural setting includes a real-world event such as a basketball game, the natural setting may include the entire basketball arena where the game is taking place (e.g., including the seating areas, etc.) while stage space 302 may include only the basketball court itself and the space above the basketball court where the game is played. In other examples, stage space 302 may include a stage where performers (e.g., actors in a play, musicians at a concert, a set where a production is being filmed, etc.) are performing, or other relevant areas of interest (e.g., specific turns and/or the finish line on a racetrack) depending on the nature of the natural setting, the level of user interest in the natural setting, the financial resources and priorities of the virtual reality media provider capturing the natural setting, and any other factors that may serve a particular implementation.

In some examples, the fixed positions at the natural setting where capture devices 304 are disposed include fixed positions outside of stage space 302 (e.g., off of the basketball court) while objects 306 that capture devices 304 may be directed at and for which individually-manipulable volumetric models may be created and manipulated may be within stage space 302 (e.g., on the basketball court).

Capture devices 304 may be the same or similar to capture devices 204, described above in relation to FIG. 2. As shown, capture devices 304 may be disposed at fixed positions in and around the natural setting (e.g., the real-world event of the basketball game) such as surrounding stage space 302 (in the case of capture devices 304-*i*) and/or in the middle of stage space 302 (in the case of capture device 304-*o*). Thus, as described above, capture devices 304-*i* may have limited viewing angles but may be directed inward to continuously capture details of what is happening in stage space 302. Conversely, capture device 304-*o* may be a 360-degree outward facing synchronous video and depth capture device (e.g., a 360-degree camera) configured to continuously capture 360-degree 2D video data and depth data for surfaces of objects 306 within stage space 302, as well as for objects 306 visible around the vicinity of the natural setting that are outside of stage space 302. For example, capture device 304-*o* may continuously capture data representative of objects in the spectator seating areas at the venue in which the basketball game is taking place. Because capture device 304-*o* may not be able to be positioned directly within stage space 302 (i.e., because it would interfere with the basketball game), capture device 304-*o* may be suspended above stage space 302 or otherwise positioned as may serve a particular implementation.

A configuration of capture devices 304 may include any suitable number of cameras as may serve a particular implementation. For example, the number and position of capture devices 304 may be determined based on a target quality level a virtual reality media provider strives to provide and/or based on a minimum number of cameras to reasonably capture data from objects 306 from enough angles to be able to adequately generate the individually-manipulable volumetric models of the surfaces of objects 306. In other words, even when objects 306 are dynamically moving around within stage space 302 such that one object 306 may completely or partially block the view of another object 306 from the angle of a first capture device 304, the number and placement of capture devices 304 may ensure that a second capture device 304 will have a better angle with which to capture data for the blocked object 306 than does the first capture device 304.

Objects 306 may include any objects within the vicinity of the natural setting (e.g., located at or around the real-world event of the basketball game) inside or outside stage space 302. For example, objects 306 may include people on the court (e.g., basketball players, referees, and other people on the basketball court), basketball 308, and/or other living and/or inanimate objects such as basketball standards (i.e., backboards, rims, nets, etc.), the floor of the basketball court, people and/or furniture on the sidelines of the basketball game, spectators and seating areas surrounding the basketball court, and the like. A specific example of how 2D video data and depth data may be captured and used to create an individually-manipulable volumetric model of basketball 308 will be described below.

Servers 312 may include any components described herein that may perform operations for creating and manipulating an individually-manipulable volumetric model of an object 306 located in the vicinity of the natural setting of the basketball game. For example, servers 312 may include a plurality of powerful server systems (e.g., having multiple graphics processing units) that implement system 100 and/or any of the systems or facilities described in relation to system 100 in FIG. 1 or 2 or hereafter. In particular, servers 312 may receive captured data from capture devices 304 and create individually-manipulable volumetric models of objects 306. In certain examples, servers 312 may receive the captured data and create the individually-manipulable volumetric models in real time, such that users not present at the natural setting (e.g., not attending the basketball game) may be able to still experience the natural setting live (i.e., in real time). Servers 312 may also provide virtual reality media content representative of an immersive virtual reality world (e.g., to media player device 316 over network 314), and may individually manipulate (e.g., in real time) the individually-manipulable volumetric models of objects 306 with respect to the immersive virtual reality world within the virtual reality media content while user 318 is experiencing the immersive virtual reality world using media player device 316.

Network 314 may include any provider-specific network (e.g., a cable or satellite carrier network or a mobile telephone network), the Internet, wide area network, or any other suitable network. Data may flow between servers 312, or between servers 312 and media player device 316 using any communication technologies, devices, media, and protocols as may serve a particular implementation. For example, servers 312 may communicate with one another or with media player device 316 using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies. While only one network 314 is shown to interconnect servers 312 and media player device 316 in FIG. 3, it will be recognized that these devices and systems may intercommunicate by way of multiple interconnected networks as may serve a particular implementation.

Media player device 316 may be used by user 318 to access and experience virtual reality media content received from system 100 (e.g., from servers 312). To this end, media player device 316 may include or be implemented by any device capable of presenting a field of view of an immersive virtual reality world (e.g., an immersive virtual reality world corresponding to the natural setting) and detecting user input from user 318 to dynamically update a scene of the immersive virtual reality world presented within the field of view as user 318 experiences the immersive virtual reality world.

For example, the field of view may provide a window through which user 318 may easily and naturally look around the immersive virtual reality world. The field of view may be presented by media player device 316 (e.g., on a display screen of media player device 316) and may include video depicting objects surrounding the user within the immersive virtual reality world. Additionally, the field of view may dynamically change in response to user input provided by user 318 as user 318 experiences the immersive virtual reality world. For example, media player device 316 may detect user input (e.g., moving or turning the display screen upon which the field of view is presented) from user 318. In response, the field of view may display different objects and/or objects seen from a different viewpoint (e.g., a viewpoint corresponding to the position of the display screen) in place of the objects seen from the previous viewpoint.

In some examples, media player device 316 may be configured to allow user 318 to select respective virtual reality media content programs (e.g., associated with different natural settings and real-world events, as well as other types of virtual reality media content programs) that user 318 may wish to experience. In certain examples, media player device 316 may download virtual reality media content programs that user 318 may experience offline (e.g., without an active connection to servers 312). In other examples, media player device 316 may request and receive data streams representative of virtual reality media content programs that user 318 experiences while media player device 316 remains in active communication servers 312 (e.g., system 100) by way of network 314.

To facilitate user 318 in experiencing virtual reality media content, media player device 316 may include or be associated with at least one display screen (e.g., a head-mounted display screen built into a head-mounted virtual reality device or a display screen of a mobile device mounted to the head of the user with an apparatus such as a cardboard apparatus) upon which scenes of an immersive virtual reality world may be displayed. Media player device 316 may also include software configured to receive, maintain, and/or process data representative of the immersive virtual reality world to present the scenes of the immersive virtual reality world on the display screens of the media player devices. For example, media player device 316 may include dedicated, standalone software applications (e.g., mobile applications) configured to process and present data representative of immersive virtual reality worlds on the displays. In other examples, the software used to present the particular scenes of the immersive virtual reality worlds may include non-dedicated software such as standard web browser applications.

Media player device 316 may take one of several different form factors. For example, media player device 316 may include or be implemented by a head-mounted virtual reality device (e.g., a virtual reality gaming device) that includes a head-mounted display screen, by a personal computer device (e.g., a desktop computer, laptop computer, etc.), by a mobile or wireless device (e.g., a smartphone, a tablet device, a mobile reader, etc.), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 318.

Figure 4:
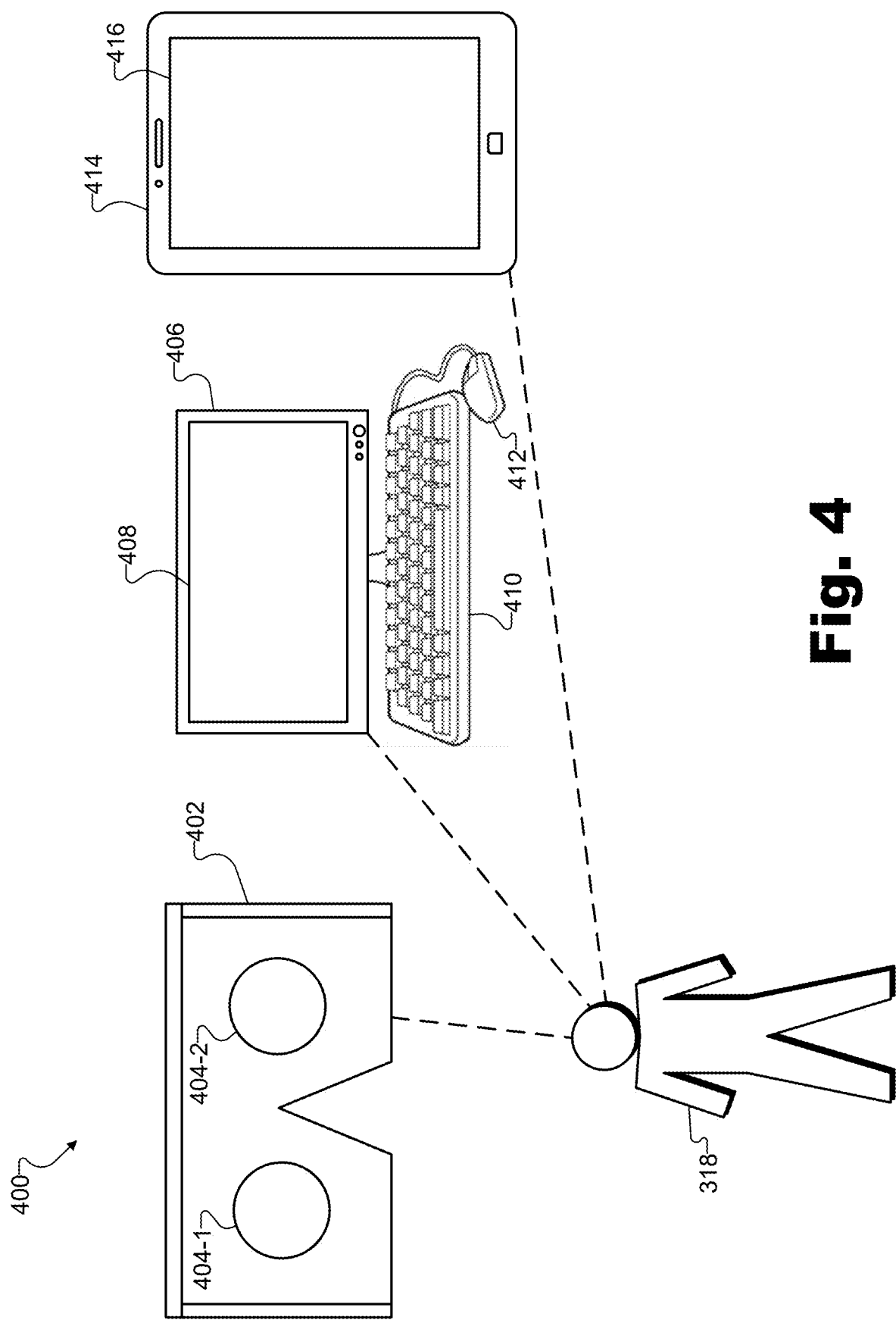
FIG. 4 illustrates exemplary media player devices configured to facilitate a user in experiencing an immersive virtual reality world that includes virtual reality media content with individually-manipulable volumetric models of objects according to principles described herein.

To illustrate, FIG. 4 shows different form factors of media player device 316 configured to facilitate user 318 in experiencing an immersive virtual reality world based on individually-manipulable volumetric models of objects located in a natural setting according to methods and systems described herein.

As one example, a head-mounted virtual reality device 402 may be mounted on the head of user 318 and arranged so that each of the eyes of user 318 sees a distinct display screen 404 (e.g., display screens 404-1 and 404-2) within head-mounted virtual reality device 402. In some examples, a single display screen 404 may be presented and shared by both eyes of user 318. In other examples, distinct display screens 404 within head-mounted virtual reality device 402 may be configured to display slightly different versions of a field of view of an immersive virtual reality world (e.g., representative of the natural setting). For example, display screens 404 may be configured to display stereoscopic versions of the field of view that may be captured by one or more stereoscopic cameras to give user 318 the sense that the immersive virtual reality world presented in the field of view is three-dimensional. Display screens 404 may also be configured to fill the peripheral vision of user 318, providing even more of a sense of realism to user 318.

Moreover, head-mounted virtual reality device 402 may include motion sensors (e.g., accelerometers), directional sensors (e.g., magnetometers), orientation sensors (e.g., gyroscopes), and/or other suitable sensors to detect natural movements (e.g., head movements) of user 318 as user 318 experiences the immersive virtual reality world. Thus, user 318 may provide input indicative of a desire to move the field of view in a certain direction and by a certain amount in the immersive virtual reality world by simply turning his or her head in that direction and by that amount. In some examples, user 318 may use a physical console or controller to dynamically select a dynamically selectable viewpoint corresponding to an arbitrary location within the natural setting (e.g., a viewpoint on stage space 302) from which to experience (e.g., look around) the immersive virtual reality world corresponding to the natural setting.

In some examples, system 100 may manipulate individually-manipulable volumetric models of objects within an immersive virtual reality world based on decisions made on the server side (e.g., by content creators associated with a virtual reality media provider operating system 100). However, in other examples, user 318 may be empowered to cause system 100 to manipulate some or all of the individually-manipulable volumetric models from which the immersive virtual reality world is generated. To this end, head-mounted virtual reality device 402 may include a user interface to allow user 318 to manipulate (e.g., in real time) individually-manipulable volumetric models of various objects presented within an immersive virtual reality world. For example, the user interface may allow user 318 to replace one object in the immersive virtual reality world (e.g., a car, a character played by a particular actor, etc.) with another object (e.g., a truck, the character played by a different actor, etc.). Similarly, the user interface may allow user 318 to remove or add particular objects, modify objects, or otherwise manipulate objects within the immersive virtual reality world in any way described herein and/or as may serve a particular implementation.

As another example of a media player device 316, a personal computer device 406 having a display screen 408 (e.g., a monitor) may be used by user 318 to experience the immersive virtual reality world corresponding to the natural setting. Because display screen 408 may not provide the distinct stereoscopic view for each of the user's eyes and/or may not fill the user's peripheral vision, personal computer device 406 may not provide the same degree of immersiveness that head-mounted virtual reality device 402 provides. However, personal computer device 406 may be associated with other advantages such as its ubiquity among casual virtual reality users that may not be inclined to purchase or use a head-mounted virtual reality device. In some examples, personal computer device 406 may allow a user to experience virtual reality content within a standard web browser so that user 318 may conveniently experience the immersive virtual reality world without using special devices or downloading special software.

User 318 may provide user input to personal computer device 406 by way of a keyboard 410, a mouse 412, and/or any other such input device as may serve a particular implementation. For example, user 318 may use mouse 412 or navigation keys on keyboard 410 to move the field of view (i.e., to look around the immersive virtual reality world) and/or to dynamically select a viewpoint within the natural setting from which to experience the immersive virtual reality world (i.e., to "walk" or "fly" around within the immersive virtual reality world). In certain examples, a combination of keyboard 410 and mouse 412 may be used. Personal computer device 406 may additionally include a user interface to allow for manipulation of objects (e.g., by individually manipulating the individually-manipulable volumetric models included within the immersive virtual reality world) similar to the user interface described above in relation to head-mounted virtual reality device 402.

As yet another example of a media player device 316, a mobile device 414 having a display screen 416 may be used by user 318 to experience the immersive virtual reality world corresponding to the natural setting. Mobile device 414 may incorporate certain advantages of both head-mounted virtual reality devices and personal computer devices to provide the most versatile type of media player device for experiencing the immersive virtual reality world. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 318 with an immersive experience comparable to that provided by head-mounted virtual reality devices. For example, mobile device 414 may be configured to divide display screen 416 into two versions (e.g., stereoscopic versions) of a field of view and to fill the peripheral vision of user 318 when mobile device 414 is mounted to the head of user 318 using a relatively inexpensive and commercially-available mounting apparatus (e.g., a cardboard apparatus). In other embodiments, mobile device 414 may facilitate experiencing the immersive virtual reality world by receiving movement-based user input at arm's length (i.e., not mounted to the head of user 318 but acting as a hand-held dynamic window for experiencing the immersive virtual reality world), by receiving swipe gestures on a touchscreen, or by other techniques that may serve a particular embodiment.

Mobile device 414 may additionally include an interface to allow for manipulation of objects (e.g., by individually manipulating the individually-manipulable volumetric models included within the immersive virtual reality world) similar to the user interface described above in relation to head-mounted virtual reality device 402.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

As mentioned above, it may be desirable for user 318 to experience a natural setting (e.g., a real-world event such as a basketball game) in real time (e.g., at the same time the real-world event is occurring or after a trivial period of delay). However, in certain examples, user 318 may wish to experience the natural setting in a time-shifted manner, rather than in real time. For example, if the natural setting is associated with a real-world event that begins at a particular time and user 318 tunes in to the virtual reality media content representative of the real-world event fifteen minutes late, user 318 may wish to experience the real-world event starting from the beginning (i.e., starting fifteen minutes before the time that user 318 tunes into the virtual reality media content representative of the real-world event). Alternatively, user 318 may be busy when the real-world event occurs and may wish to experience the real-world event later (e.g., the following day).

To this end, system 100 may store and maintain, subsequent to providing virtual reality media content representative of the immersive virtual reality world in real time, a recording of a volumetric data stream that includes all of the individually-manipulable volumetric model of the objects at the real-world event. Then, when user 318 later wishes to experience the real-world event, system 100 may provide virtual reality media content corresponding to the real-world event to media player device 316 based on the recording of the volumetric data stream.

Returning to FIG. 3 to illustrate, configuration 300 includes time shift storage 320. Time shift storage 320 may be implemented within system 100 (e.g., within storage facility 108). Additionally, while time shift storage 320 is illustrated as a stand-alone component in configuration 300, it will be understood that time shift storage 320 may be included within servers 312 and/or or within any other server or system as may serve a particular implementation. When user 318 desires to experience a time-shifted, rather than a real time, version of the real-world event, system 100 (e.g., servers 312) may request and receive data representative of the volumetric data stream recorded in time shift storage 320 and provide virtual reality media content representative of the real-world event to media player device 316 in the same or a similar manner as if user 318 were experiencing the real-world event in real-time.

An example will now be provided to illustrate how system 100 may continuously capture 2D video data and depth data for a surface of a first object located in a natural setting, continuously distinguish the first object from a second object located in the natural setting with the first object, and then continuously generate and update an individually-manipulable volumetric model of the first object.

Figure 5:
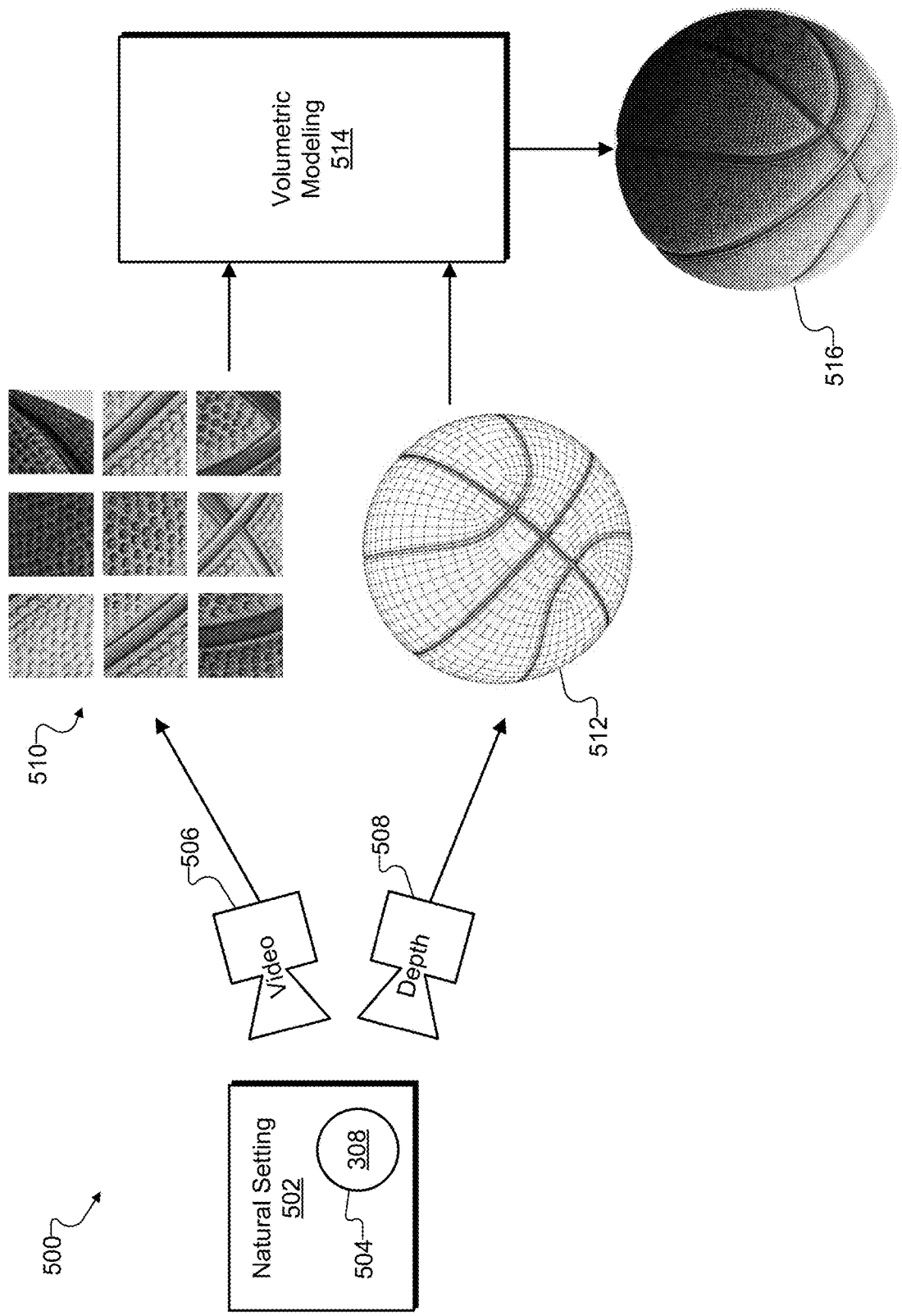
FIG. 5 illustrates an exemplary technique for creating an individually-manipulable volumetric model of an exemplary object in a natural setting according to principles described herein.

In particular, FIG. 5 illustrates an exemplary technique 500 for creating an individually-manipulable volumetric model of an exemplary object in a natural setting. As shown in FIG. 5, a natural setting 502 may include an object 504. A configuration of synchronous video capture devices 506 and a configuration of synchronous depth capture devices 508 may, respectively, capture 2D video data 510 and depth data 512 for the surface of object 504 within natural setting 502. For example, video capture devices 506 and depth capture devices 508 may be disposed at fixed positions in a vicinity of object 504 (e.g., surrounding object 504) in natural setting 502 such that 2D video data and depth data for the entire surface of object 504 (i.e., from every angle and vantage point) may be captured. 2D video data 510 and depth data 512 may then undergo volumetric modeling 514 to generate an individually-manipulable volumetric model 516 (e.g., a 3D model, a 4D model, etc.) of object 504. Individually-manipulable volumetric model 516 may be included with individually-manipulable volumetric models of other objects within natural setting 502 (not explicitly shown) in a volumetric data stream (e.g., a real-time volumetric data stream) representative of the natural setting, as will be described in more detail below.

Natural setting 502 may be any natural setting mentioned herein or that may serve a particular embodiment. To continue with the example presented above in relation to FIG. 3, for example, natural setting 502 may be a real-world event including a basketball game. Similarly, object 504 may be any visible (i.e. nontransparent) object mentioned herein or that may otherwise be present within natural setting 502. For example, object 504 may be animate (e.g., a person or an animal) or inanimate, a solid, a liquid, or a non-transparent gas (e.g., fog generated from a fog machine at a concert), etc. In this example, as shown, object 504 is basketball 308.

Video capture devices 506 and depth capture devices 508 may be the same or similar to other video and depth capture devices described herein, such as capture devices 204 and/or 304. While only one video capture device and one depth capture device is illustrated in FIG. 5, it will be understood that each capture device may represent a configuration of capture devices that may surround object 504 to capture data for the surface of object 504 from all sides (e.g., such as shown by capture devices 304 in FIG. 3). As shown, video capture devices 506 and depth capture devices 508 may be standalone capture devices (e.g., video cameras and 3D depth scanning devices, respectively). Alternatively, as described above, video capture devices 506 and depth capture devices 508 may be integrated into unitary video-depth capture devices configured to capture both 2D video data and depth data using the same unitary video-depth capture devices. In some examples, as mentioned above, depth data may be determined based solely on 2D video data (e.g., 2D video data from different vantage points) such that depth capture devices 508 may represent the same video cameras and/or other types of image capture devices represented by video capture devices 506.

2D video data 510 may be captured by video capture devices 506 and may include image or texture data representative of visible characteristics (e.g., color, shading, surface texture, etc.) of the surface of object 504 from all perspectives. For example, as illustrated in FIG. 5, 2D video data 510 may represent visible characteristics of various sections (e.g., small areas) of the surface of basketball 308 as the sections appear from various vantage points of various video capture devices 506. For illustrative purposes, 2D video data 510 in FIG. 5 shows a plurality of 2D images associated with various random sections of the surface of basketball 308 from a single vantage point. However, it will be understood that 2D video data 510 may include data associated with a plurality of vantage points surrounding basketball 308 and may be captured, packaged, stored, formatted, and transmitted in any way that may serve a particular embodiment. For example, 2D video data 510 may be delivered to volumetric modeling 514 with detailed information (e.g., metadata) indicating temporal and spatial information, such as when the 2D video data was captured, where the 2D video data was captured, etc.

Similarly, depth data 512 may be captured by depth capture devices 508 and may comprise depth data representative of spatial characteristics (e.g., locational coordinates, etc.) of the surface of object 504 from all perspectives. For example, as illustrated in FIG. 5, depth data 512 may include captured data representative of depth characteristics of various sections (e.g., small areas) of the surface of basketball 308 such that a wireframe model of basketball 308 may be generated (e.g., stitched together) based on the depth data captured from various vantage points associated with each depth capture device 508. Depth data 512 may be captured, packaged, stored, formatted, and transmitted in any way that may serve a particular embodiment. For example, depth data 512 may be delivered to volumetric modeling 514 with detailed information (e.g., metadata) indicating temporal and spatial information, such as when the depth data was captured, where the depth data was captured, etc.

Depth data 512 may be determined by depth capture devices 508 using any technique or modality that may serve a particular implementation. In particular, certain depth capture techniques may be used to increase the time efficiency of the depth capture (i.e., by minimizing capture and/or processing time) to facilitate generating individually-manipulable volumetric models in real time.

For example, depth capture devices 508 may capture depth data 512 by using a stereoscopic triangulation depth capture technique. In this technique, depth capture devices 508 may be configured to capture 2D video data (i.e., depth capture devices 508 may be one and the same as video capture devices 506). The stereoscopic triangulation depth capture technique may include a first depth capture device 508 capturing 2D video data of points on the surface of object 504 from a first angle and a second depth capture device 508 capturing 2D video data of the points on the surface of object 504 from a second angle. The depth of the points on the surface of object 504 are triangulated based on the first angle, the second angle, and on a predetermined distance (i.e., a known distance based on the configuration of depth capture devices 508) between the first depth capture device 508 and the second depth capture device 508.

In the same or other examples, depth capture devices 508 may capture depth data 512 by using a time-of-flight depth capture technique. For example, depth capture devices 508 may use a radar-based ranging technique (e.g., laser radar) using electromagnetic pulses, a sonar-based ranging technique using sound pulses, and/or any other type of ranging technique as may serve a particular implementation. In the time-of-flight technique, each depth capture device 508 may generate a pulse (e.g., an electromagnetic pulse, a sound pulse, etc.) from a source associated with the depth capture device 508 at a particular time, and may be specially configured to measure a total transit time for the pulse to travel from the pulse source to points on the surface of object 504 (i.e., to travel to object 504), and, after being reflected by the surface of object 504, to travel from the points on the surface of object 504 to a pulse detector associated with the depth capture device 508 (i.e., to return back to the depth capture device 508). Based on the total transit time and the known speed of the pulse (e.g., the speed of light, the speed of sound, etc.), a depth of each of the points on the surface of object 504 may thus be determined.

In the same or other examples, depth capture devices 508 may capture depth data 512 by using an infrared pattern analysis depth capture technique. In this technique, an infrared pattern emitter device (i.e., associated with or separate from depth capture devices 508) may project a random scatter (i.e., a pattern) of randomly-sized infrared dots onto surfaces of various objects within natural setting 502, including object 504. A first depth capture device 508 may be configured with infrared sensing capability such that the first depth capture device 508 may detect the random scatter of randomly-sized infrared dots projected onto the surfaces of the objects from a first angle. Similarly, a second depth capture device 508 similarly configured with infrared sensing capability may detect the random scatter of randomly-sized infrared dots projected onto the surfaces of the objects from a second angle. The depth of the surfaces of the objects may then be triangulated based on the first angle, the second angle, and on a predetermined distance (i.e., a known distance based on the configuration of depth capture devices 508) between the first depth capture device 508 and the second depth capture device 508.

Because real-time depth detection in a non-controlled, real-world environment may be difficult and inexact, in some examples, a plurality of different depth capture techniques may be employed (e.g., such as the depth capture techniques described above). Subsequently, depth data obtained using each of the depth capture techniques employed may be combined to determine the most accurate depth data for objects within natural setting 502 possible.

Concurrently with or subsequent to video capture devices 506 and depth capture devices 508 capturing 2D video data 510 and depth data 512 for object 504, volumetric modeling 514 may distinguish object 504 from one or more additional objects located in natural setting 502 along with object 504. Volumetric modeling 514 may distinguish objects using one or more exemplary techniques described below or using any technique that may serve a particular implementation. In particular, certain techniques for distinguishing objects may be used to increase the time efficiency of the distinguishing (i.e., by minimizing processing time) to facilitate the generation of individually-manipulable volumetric models in real time.

Figure 6:
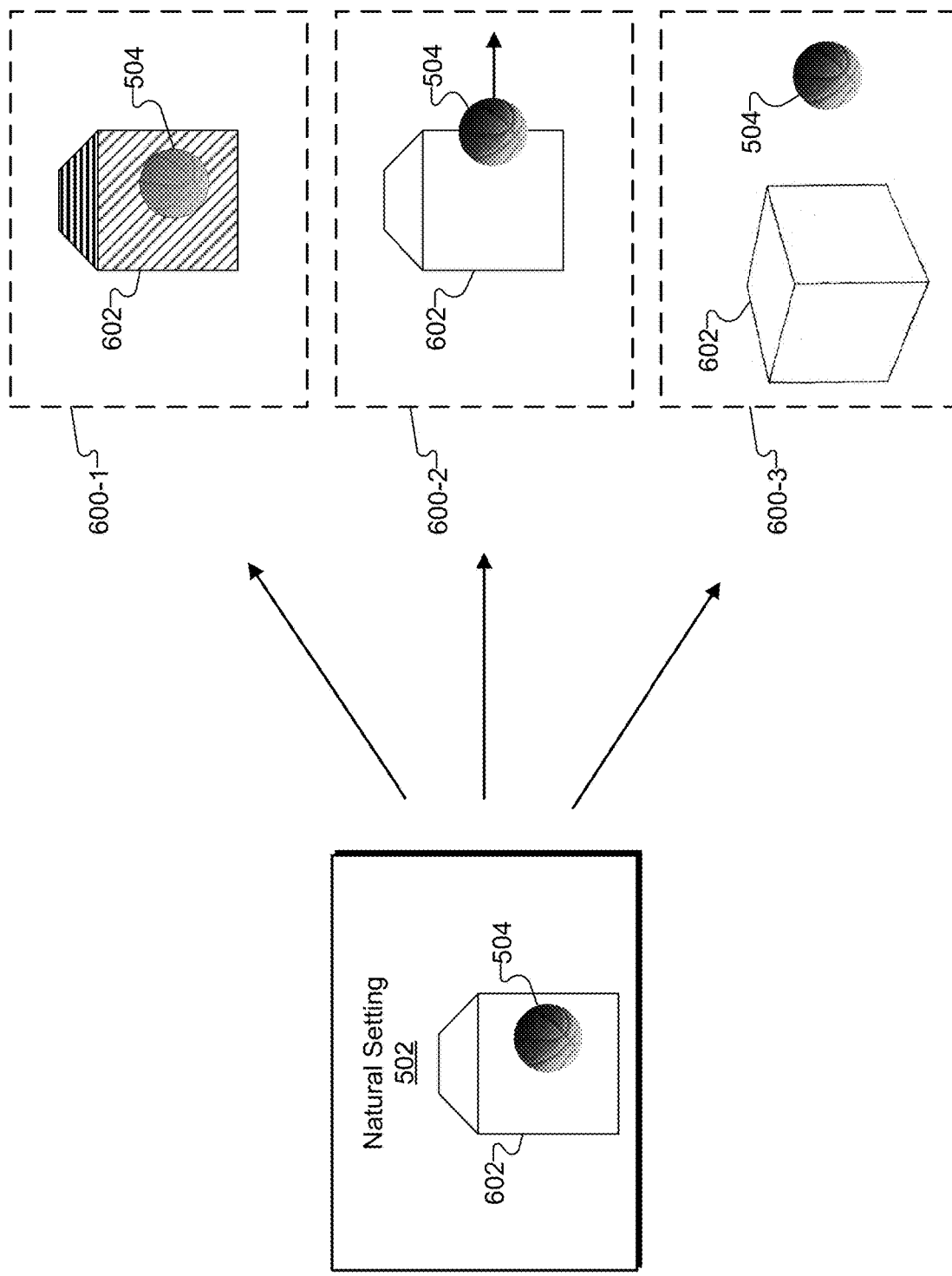
FIG. 6 illustrates exemplary techniques for distinguishing a first object located in a natural setting from a second object located in the natural setting along with the first object according to principles described herein.

For example, FIG. 6 shows exemplary techniques 600 (e.g., techniques 600-1 through 600-3) for distinguishing object 504 (i.e., basketball 308) located in natural setting 502 from a second object 602 located in natural setting 502 along with object 504. On the left side of FIG. 6, object 504 is illustrated within natural setting 502 along with object 602. While drawn in FIG. 6 as a simple cube, object 602 may represent any other object that may be located within natural setting 502. For example, since natural setting 502 is a basketball game in this example, object 602 may represent a basketball standard, the floor of the basketball court, a player holding the ball, or several background objects (e.g., spectators in an audience of the basketball game) seen behind object 504 (i.e., basketball 308) at certain times and/or from certain vantage points during the basketball game. Regardless of what object 602 represents, volumetric modeling 514 may be configured to determine that object 602 is a separate object (i.e., such that object 602 should be associated with a separate individually-manipulable volumetric model) from object 504, even though, from 2D video captured from the vantage point illustrated in FIG. 6, objects 602 and 504 may partially or completely overlap and/or otherwise appear to be part of a single object.

In order to distinguish object 504 from object 602, a first technique that system 100 (e.g., volumetric modeling 514) may employ is identifying objects 504 and 602 based on 2D video data 506, and then determining that object 504 as identified is different from object 602 as identified. Specifically, system 100 may use object recognition algorithms to identify (e.g., recognize) object 504 as a basketball and object 602 as, for example, a human being (e.g., a basketball player). System 100 may be programmed to recognize that basketballs and human beings are separate objects, even when a human being may be holding a basketball or positioned behind the basketball. Accordingly, based on these identifications (i.e., object recognitions), system 100 may distinguish object 504 from object 602.

Another technique that system 100 may use to distinguish object 504 from object 602 is illustrated by technique 600-1. In technique 600-1, shading is used to indicate relative depths captured from different objects. Accordingly, as shown, object 504 is lightened to indicate that captured depth data 512 indicates that object 504 may be relatively close, while object 602 is darkened to indicate that captured depth data 512 indicates that object 602 may be significantly farther away in three-dimensional space than may appear to be the case judging only from 2D video data 510. Thus, based on captured depth data 512, system 100 may determine that object 504 is located at least a predetermined distance away from object 602, which may indicate that objects 504 and 602 are likely to be different objects.

Another technique that system 100 may use to distinguish object 504 from object 602 is illustrated by technique 600-2. In technique 600-2, the arrow indicates that object 504 may be moving (e.g., moving to the right) in relation to object 602. As such, system 100 may determine, based on 2D video data 510, that object 504 is moving in relation to object 602, which system 100 may use as an indication that objects 504 and 602 are likely to be separate, independent objects.

Yet another technique that system 100 may use to distinguish object 504 from object 602 is illustrated by technique 600-3. In technique 600-3, objects 504 and 602 are viewed from a different vantage point than the vantage point shown on the left side of FIG. 6. Specifically, the original vantage point showing the objects overlapping may come from a first video capture device 506, while the vantage point shown in technique 600-3 may represent the vantage point of a second video capture device 506 in a different fixed position in the vicinity of objects 504 and 602. From the vantage point illustrated in technique 600-3, distinguishing object 504 from object 602 may be trivial because the objects are clearly distinct and do not overlap. Thus, even if 2D video data 510 indicates that objects 504 and 602 overlap from a first vantage point of a first video capture device 506, system 100 may determine that 2D video data 510 also indicates that objects 504 and 602 do not overlap from a second vantage point of at least one other video and depth capture device (e.g., the second video capture device 506). System 100 may thus determine that objects 504 and 602 are likely to be distinct objects.

It will be noted that system 100 may use any or all of the techniques described above individually or in combination with one another, as well as with other techniques not explicitly described herein, to distinguish one object from another in a natural setting.

Returning to FIG. 5, concurrent with or subsequent to the capturing of 2D video data 510 and depth data 512 and/or the distinguishing of object 504 from other objects (e.g., object 602) within natural setting 502, volumetric modeling 514 may process 2D video data 510 together with depth data 512 to generate individually-manipulable volumetric model 516 of object 504 in any suitable way. For example, volumetric modeling 514 may combine depth data 512 (e.g., using temporal and spatial metadata included with depth data 512) to create (e.g., stitch together) a wireframe model of basketball 308, as shown in the drawing representing depth data 512. Volumetric modeling 514 may then map 2D video data 510 onto the wireframe model by matching temporal and spatial metadata included with 2D video data 510 with the temporal and spatial information included with depth data 512.

In this way, volumetric modeling 514 may generate individually-manipulable volumetric model 516 (e.g., a 3D model, a 4D model, etc.) of object 504 from 2D video data 510 and depth data 512. Individually-manipulable volumetric model 516 may be included with individually-manipulable volumetric models of other objects within natural setting 502 in a volumetric data stream (e.g., a real-time volumetric data stream) representative of natural setting 502, as will be described in more detail below. However, each individually-manipulable volumetric model of each object within natural setting 502 may be individually and independently manipulable in relation to the other individually-manipulable volumetric models of the other objects within natural setting 502. Accordingly, based on the volumetric data stream including individually-manipulable volumetric model 516 and other individually-manipulable volumetric models for other objects within natural setting 502, virtual reality media content may be generated and provided to arbitrarily and individually manipulate any of the objects within natural setting 502 (e.g., including objects 504 and 602) in any way described herein. For example, virtual reality media content may be provided allowing a user to view natural setting 502 in real time from any arbitrary location within natural setting 502.

By generating distinct, individually-manipulable volumetric models of each object within natural setting 502 by combining depth data to generate wireframe models of individual objects at specific points in space in the vicinity of the objects within natural setting 502 and mapping 2D video data onto the wireframe models to create individually-manipulable volumetric models of the objects within natural setting 502, objects within an immersive virtual reality world may be individually and independently manipulated in various ways that may not be possible (or may be extremely inefficient and/or processing intensive) by trying to manipulate 2D video data alone.

Figure 7:
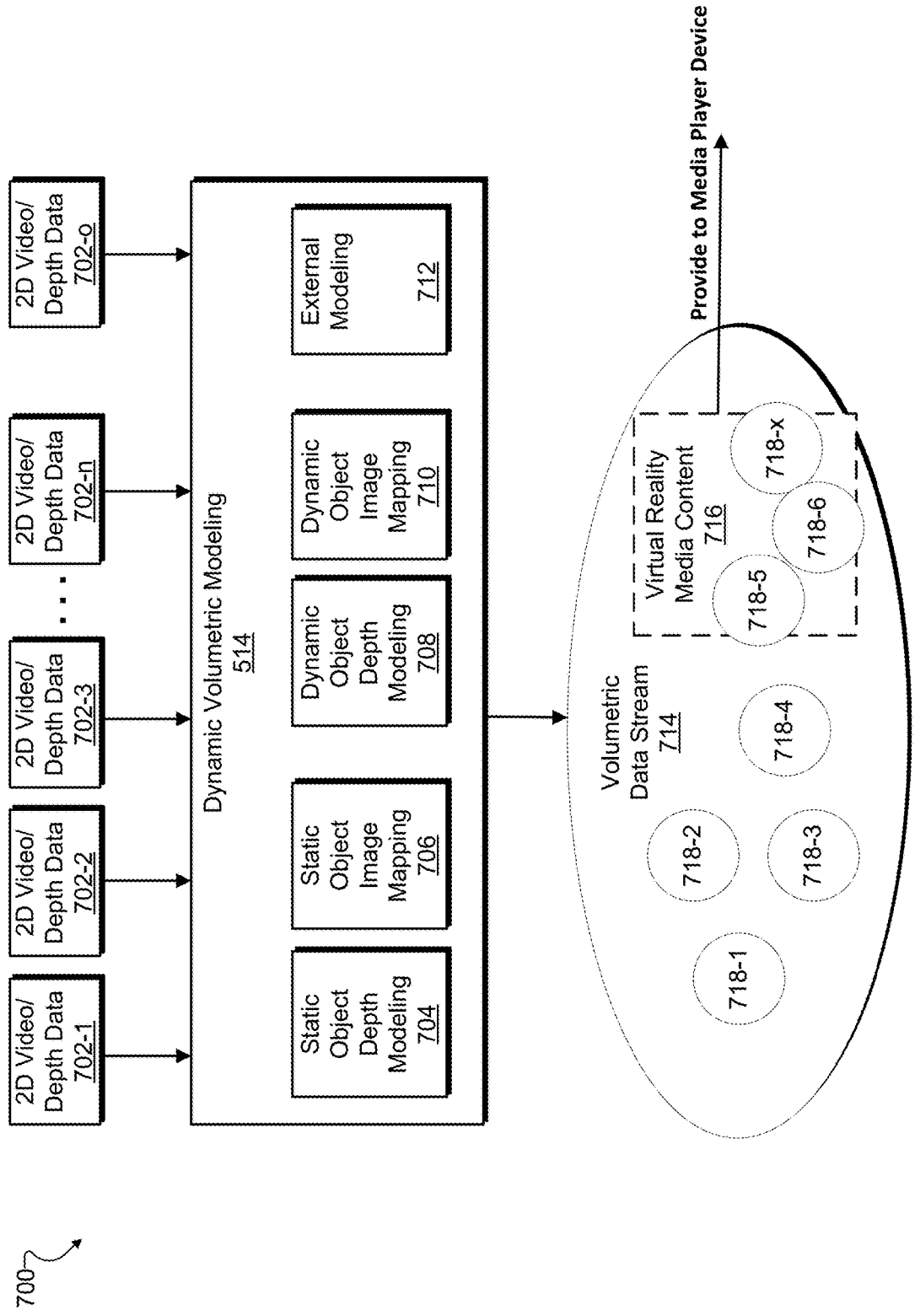
FIG. 7 illustrates an exemplary dataflow for creating and manipulating an individually-manipulable volumetric model of an object located in a natural setting according to principles described herein.

FIG. 7 illustrates an exemplary dataflow 700 for creating and manipulating an individually-manipulable volumetric model of an object (e.g., object 504) located in a natural setting (e.g., natural setting 502). The data in dataflow 700 may be generated, processed, distributed, etc., in any way described herein or as may serve a particular implementation. As shown in FIG. 7, 2D video-depth data 702 (e.g., 2D video-depth data 702-1 through 702-n and 702-o) may flow into volumetric modeling 514, where static object depth modeling 704, static object image mapping 706, dynamic object depth modeling 708, dynamic object image mapping 710, and external modeling 712 may process 2D video-depth data 702 to generate (e.g., in real time) a volumetric data stream 714 (e.g., a real-time volumetric data stream). Virtual reality media content 716, which may be generated based on volumetric data stream 714, may then be provided to a media player device.

Volumetric data stream 714 may include one or more individually-manipulable volumetric models 718 (e.g., individually-manipulable volumetric models 718-1 through 718-x). For example, individually-manipulable volumetric models 718 may be 3D models (e.g., models representative of the three spatial dimensions of an object) that may be manipulated to move and/or perform particular actions over a period of time (e.g., a 3D model of a first person replacing a 4D model of a second person and performing the same actions as will be described in more detail below). In other examples, individually-manipulable volumetric models 718 may be 4D models (e.g., models representative of the three spatial dimensions of an object as well as a temporal dimension) that may move and/or perform particular actions inherent to the 4D model itself. Virtual reality media content 716 may include one or more individually-manipulable volumetric models 718 (i.e., individually-manipulable volumetric models 718-5, 718-6, and 718-x), which may be individually-manipulated within volumetric data stream 714 before distribution (e.g., by system 100) and/or after distribution (e.g., by the media player devices).

2D video-depth data 702 may represent captured 2D video data and captured 2D depth data from a plurality of video and depth capture devices such as capture devices 204 (see FIG. 2), capture devices 304 (see FIG. 3), or capture devices 506 and 508 (see FIG. 5). For example, 2D video-depth data 502-1 may include 2D video data (e.g., similar to 2D video data 510) and depth data (e.g., similar to depth data 512) captured by a first video and depth capture device. 2D video-depth data 702-2 may include 2D video data and depth data captured by a second video and depth capture device (e.g., a video and depth capture device capturing data representative of objects from a different vantage point than the first video and depth capture device), and so forth for 2D video-depth data 702-3 through 702-n. 2D video-depth data 702-o may include 2D video data and/or depth data captured by an outward facing video and depth capture device (e.g., a 360-degree outward facing synchronous video and depth capture device such as capture device 304-o in FIG. 3).

As described above, volumetric modeling 514 may perform data processing on 2D video-depth data 702 to generate a volumetric data stream representative of individually-manipulable volumetric models 718 of the objects within the natural setting. More specifically, volumetric modeling 514 may generate individually-manipulable volumetric models 718 of at least three categories of objects: 1) static objects within the natural setting (e.g., a floor of a basketball court, basketball standards, etc.), 2) dynamic objects within the natural setting (e.g., players and referees moving around on the basketball court, a basketball being used by the players in a basketball game, etc.), and 3) external objects within (or in the vicinity of) the natural setting (e.g., objects outside the basketball court stage space such as spectators watching the basketball game, etc.). System 100 may obtain significant efficiency gains by differentiating these categories of objects and generating individually-manipulable volumetric models for the objects separately, rather than treating the different categories of objects equally. For example, by differentiating static, dynamic, and external objects as described below, system 100 may obtain efficiency gains that facilitate and/or enable system 100 to perform the immense processing required to generate and provide individually-manipulable volumetric models of objects within the natural setting in real time.

Static object depth modeling 704 may model (e.g., create wireframe depth models for) one or more static objects within the natural setting based on depth data within 2D video-depth data 702. For example, static object depth modeling 704 may determine, based on depth data, that a basketball standard is statically located at a particular location in the space above the basketball court, that the basketball standard is distinct from players and/or a basketball that may occasionally touch the basketball standard, and that the basketball standard is distinct from other objects seen behind the basketball standard (e.g., in the background) when the basketball standard is viewed from different vantage points. With these determinations, static object depth modeling 704 may generate a depth model (e.g., a wireframe model) of the basketball standard that may not yet include any color or video data, but that may represent a location in a 3D space representative of natural setting where the basketball standard is positioned.

Static object image mapping 706 may map textures, colors, etc. onto the depth model of static objects (e.g., the basketball standard) generated by static object depth modeling 704. For example, static object image mapping 706 may map the textures, colors, and so forth based on 2D video data within 2D video-depth data 702. As such, complete individually-manipulable volumetric models 718 of the static objects may be included within volumetric data stream 714. Because the static objects may not change often or at all, individually-manipulable volumetric models 718 of the static objects may be processed and updated irregularly or on an as-needed basis in order to conserve processing resources in system 100.

Dynamic object depth modeling 708 and dynamic object image mapping 710 may perform similar respective functions as static object depth modeling 704 and static object image mapping 706 for dynamic objects (e.g., objects determined to be dynamically moving in real time). However, because the dynamic object may be continuously in flux (e.g., moving around within the natural setting), individually-manipulable volumetric models 718 of the dynamic objects may be updated much more regularly in order to keep the volumetric data stream up-to-date with what is occurring within the natural setting.

External modeling 712 also may perform similar functions as the depth modeling and image mapping operations described above for external objects (e.g., background objects that are not within the stage space) such as those represented in 2D video-depth data 702-o. Because the external objects may add ambience and realism to a virtual reality experience but may not be a primary focus of the experience for many users, external modeling 712 may update models for external objects irregularly. Additionally, because 2D video-depth data 702-o may include captured data from only one or a limited number of vantage points (i.e., vantage points that do not surround the external objects to capture data from every vantage point), external modeling 712 may generate a 2D model (e.g., a model that incorporates little or no depth data but is just based on 2D video data) of the external objects, or a volumetric model that includes less detail than the individually-manipulable volumetric models 718 of, for example, the dynamic objects within a stage space of the natural setting.

As described above, volumetric data stream 714 may include individually-manipulable volumetric models 718 (e.g., 3D models, 4D models) and/or other models (e.g., 2D models) of each of the static objects, dynamic objects, and external objects within a particular natural setting. Accordingly, virtual reality media content 716 may be provided based on volumetric data stream 714 to present objects that have been individually, independently, and/or dynamically manipulated.

Figure 8:
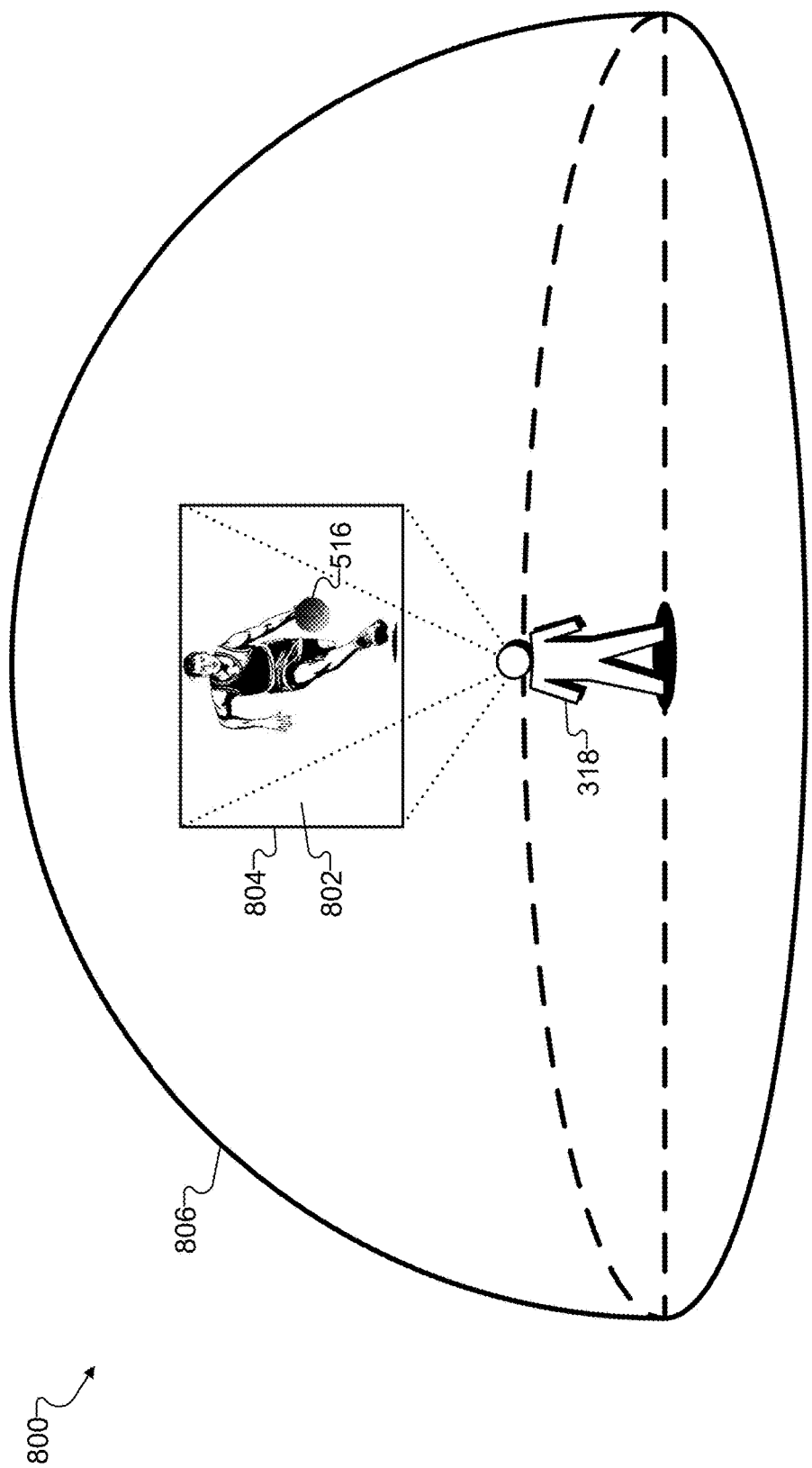
FIG. 8 illustrates an exemplary virtual reality experience in which a user is presented with exemplary virtual reality media content representative of an immersive virtual reality world corresponding to an exemplary natural setting containing an object for which an individually-manipulable volumetric model has been generated according to principles described herein.

To illustrate, FIG. 8 shows an exemplary virtual reality experience 800 in which user 318 is presented with exemplary virtual reality media content representative of an immersive virtual reality world that corresponds to a natural setting containing an object for which an individually-manipulable volumetric model has been generated. Specifically, virtual reality media content 802 is presented within a field of view 804 that shows a part of an immersive virtual reality world 806 from a viewpoint corresponding to an arbitrary location within immersive virtual reality world 806 (e.g., on the basketball court directly in front of a basketball player dribbling a basketball). As shown, an individually-manipulable volumetric model of the player is presented within virtual reality media content 802 along with individually-manipulable volumetric model 516 (e.g., the individually-manipulable volumetric model of the basketball described above in relation to FIG. 5). Immersive virtual reality world 806 may correspond to (e.g., may be based on) a natural setting of a basketball game and may be available for the viewer to experience by providing user input (e.g., head movements, keyboard input, etc.) to look around and/or to move around (i.e., dynamically select a viewpoint from which to experience) immersive virtual reality world 806.

In FIG. 8, immersive virtual reality world 806 is illustrated as a semi-sphere, indicating that user 318 may look in any direction within immersive virtual reality world 806 that is substantially forward, backward, left, right, and/or up from the viewpoint of the location under the basketball standard that user 318 has currently selected. In other examples, immersive virtual reality world 806 may include an entire 360-degree by 180-degree sphere such that user 318 may also look down. Additionally, user 318 may move around to other locations within immersive virtual reality world 806 (i.e., dynamically selecting different dynamically selectable viewpoints within the natural setting). For example, user 318 may select a viewpoint at half court, a viewpoint from the free-throw line facing the basketball standard, a viewpoint suspended above the basketball standard, or the like.

Figure 9:
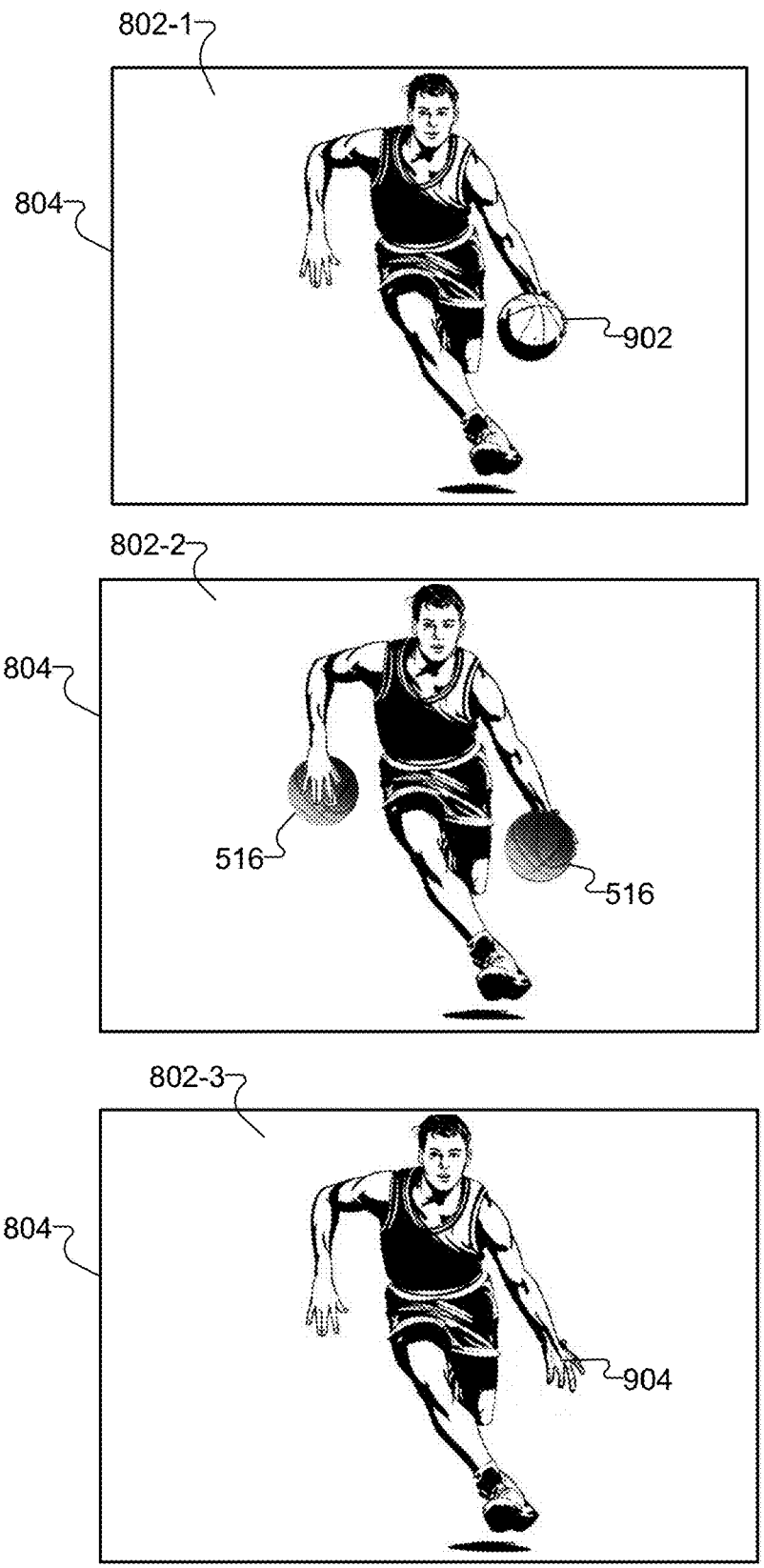
FIG. 9 illustrates exemplary manipulations that may be performed on the individually-manipulable volumetric model of FIG. 8 with respect to the immersive virtual reality world of FIG. 8 while a user is experiencing the immersive virtual reality world according to principles described herein.

Additionally, objects presented within immersive virtual reality world 806 may be individually manipulated in various ways as described herein and/or as may serve a particular implementation. For example, FIG. 9 illustrates exemplary manipulations that may be performed on individually-manipulable volumetric model 516 with respect to immersive virtual reality world 806 while user 318 is experiencing immersive virtual reality world 806. In particular, in FIG. 9, field of view 804 is illustrated as having various different versions of virtual reality media content 802 (e.g., virtual reality media content 802-1 through 802-3) where individually-manipulable volumetric model 516 has been manipulated with respect to immersive virtual reality world 806 in different ways to illustrate certain potential ways that individually-manipulable volumetric model 516 may by individually manipulated.

For example, as shown in virtual reality media content 802-1, the individually manipulating of individually-manipulable volumetric model 516 with respect to immersive virtual reality world 806 may include replacing individually-manipulable volumetric model 516 included within immersive virtual reality world 806 with an individually-manipulable volumetric model of a different object within immersive virtual reality world 806. in virtual reality media content 802-1, individually-manipulable volumetric model 516, which was in the hand of the basketball player in virtual reality media content 802 in FIG. 8, has been replaced by an individually-manipulable volumetric model 902 of a different basketball (e.g., a lighter colored basketball).

In certain examples, as mentioned above, the object being replaced within an immersive virtual reality world may be a first person (e.g., a particular actor playing a role in a virtual reality motion picture or television show, a particular athlete in a sporting event, etc.) and the object replacing the first person may be a second, different person (e.g., a different actor, a different athlete, etc.). Because system 100 may have individually-manipulable volumetric models for both the first person and the second person, and because the individually-manipulable volumetric model for the first person may be configured to perform a particular action (i.e., acting in the role, playing the sport, etc.), system 100 may replace the individually-manipulable volumetric model of the first person with the individually-manipulable volumetric model of the second person such that the individually-manipulable volumetric model of the second person performs the same action in the immersive virtual reality world that the individually-manipulable volumetric model of the first person would perform if not replaced (i.e., acting in the role in the same way as the first person, playing the sport in the same way as the first person, etc.).

More specifically, for example, system 100 may capture behavioral data from the first person with respect to various points on the surface of the first person (e.g., points corresponding to various parts of the first person's body), such as data representative of the person's arm lifting up above the head, a hand opening or shutting, a leg taking a step, etc. Then, to replace the individually-manipulable volumetric model of the first person with the individually-manipulable volumetric model of the second person, the individually-manipulable volumetric model of the second person may be manipulated such that various points on the surface of the second person (e.g., corresponding to the points on the surface of the first person) appear to perform the same actions as performed by the first person (e.g., lifting the arm above the head, opening or shutting the hand, taking the step, etc.). Accordingly, a user may select a favorite actor to play in any role or a favorite athlete to play in any sporting event, etc., even though the selected actor and/or athlete may never have actually performed the actions corresponding to the role and/or the sporting event.

In other examples, as shown in virtual reality media content 802-2, the individually manipulating of individually-manipulable volumetric model 516 with respect to immersive virtual reality world 806 may include inserting individually-manipulable volumetric model 516 into immersive virtual reality world 806 at a particular location within immersive virtual reality world 806. For example, an individually-manipulable volumetric model may be inserted into a scene corresponding to a natural setting in which the object represented by the individually-manipulable volumetric model is not (and/or never was) located, or may be arbitrarily duplicated in a scene corresponding to a natural setting in which the object is located. In virtual reality media content 802-2, individually-manipulable volumetric model 516 has not been modified in the left hand of the player, but an additional individually-manipulable volumetric model 516 has been added to the right hand of the player. In this way, individually-manipulable volumetric model 516 (or any other individually-manipulable volumetric model) may be arbitrarily added to immersive virtual reality world 806 in any location within immersive virtual reality world 806.

In yet other examples, as shown in virtual reality media content 802-3, the individually manipulating of individually-manipulable volumetric model 516 with respect to immersive virtual reality world 806 may include removing individually-manipulable volumetric model 516 from immersive virtual reality world 806. For example, in virtual reality media content 802-3, individually-manipulable volumetric model 516 has been individually and independently removed. In other words, as shown, individually-manipulable volumetric model 516 has been removed (i.e., the basketball is no longer in the player's hand) while individually-manipulable volumetric models of other objects in immersive virtual reality world 806 such as the individually-manipulable volumetric model of the basketball player himself remain unaffected. More specifically, because the player and the basketball are each represented by distinct individually-manipulable volumetric models within immersive virtual reality world 806, removing individually-manipulable volumetric model 516 representing the basketball object has not altered the individually-manipulable volumetric model of the player, as indicated by a hand 904 of the player that is now fully visible because the basketball is no longer present to obstruct hand 904. If the objects (the basketball and the player) were not associated with individually-manipulable volumetric models, but, rather, the 2D video of the basketball were merely removed or otherwise edited out of immersive virtual reality world 806, hand 904 may be fully or partially removed from the scene along with the basketball.

The manipulations described herein and specifically illustrated in relation to FIG. 9 are exemplary only. Once various objects within a natural setting have been modeled and associated with individually-manipulable volumetric models, numerous other manipulations may be possible as may serve a particular implementation. Such manipulations are within the spirit and scope of this disclosure even if not explicitly mentioned herein.

Figure 10:
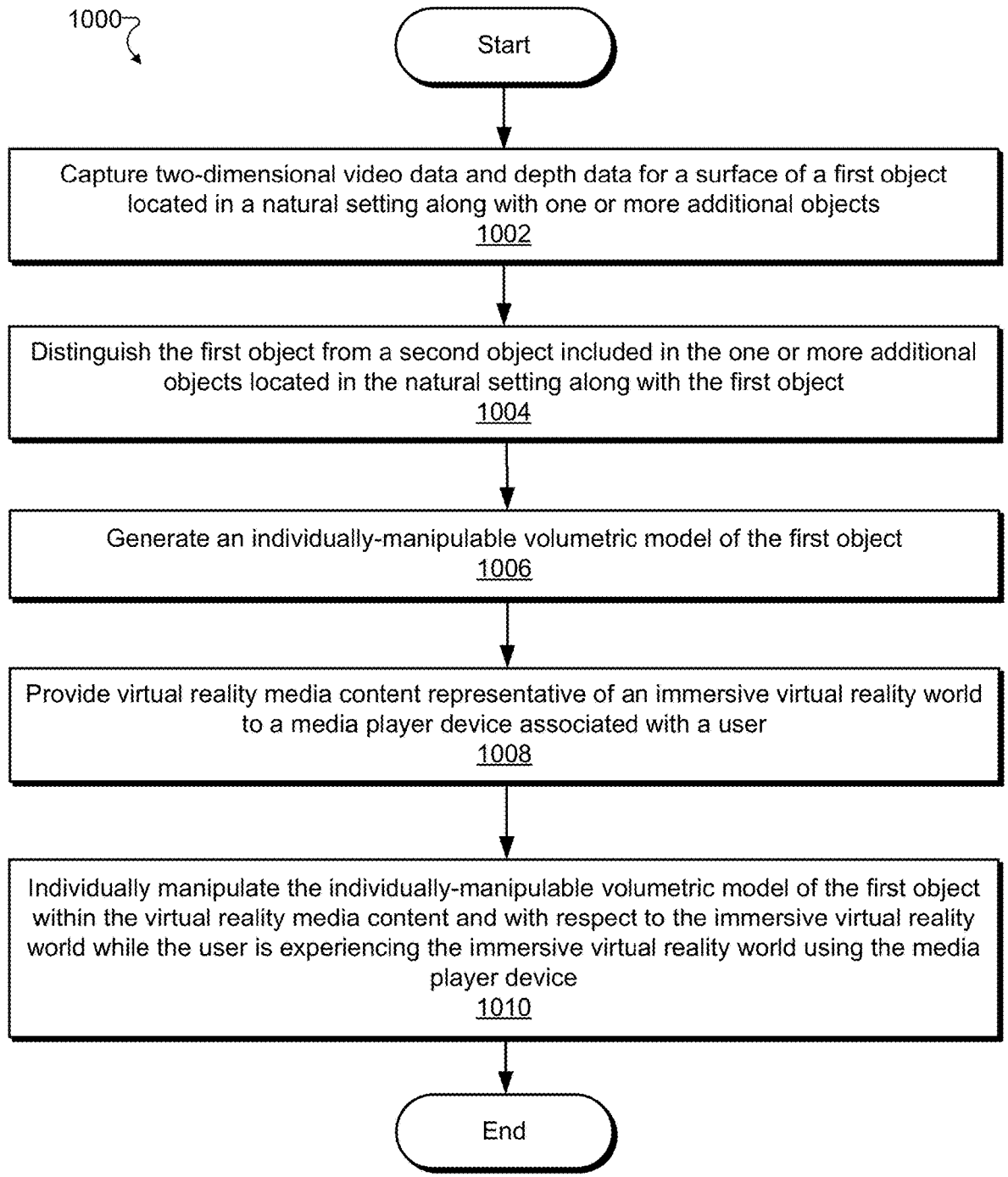
FIGS. 10 and 11 illustrate exemplary methods for creating and manipulating an individually-manipulable volumetric model of an object located in a natural setting according to principles described herein.

FIG. 10 illustrates an exemplary method 1000 for creating and manipulating an individually-manipulable volumetric model of an object located in a natural setting. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or any implementation thereof.

In operation 1002, a virtual reality media provider system that includes a configuration of synchronous video and depth capture devices disposed at fixed positions in a vicinity of a first object may capture 2D video data and depth data for a surface of the first object. In some examples, the virtual reality media provider system may capture the 2D video data and depth data while the first object is located in a natural setting along with one or more additional objects. Operation 1002 may be performed in any of the ways described herein.

In operation 1004, the virtual reality media provider system may distinguish the first object from a second object included in the one or more additional objects located in the natural setting along with the first object. For example, the virtual reality media provider system may distinguish the first object from the second object based on the captured depth data and captured 2D video data captured in operation 1002. Operation 1004 may be performed in any of the ways described herein.

In operation 1006, the virtual reality media provider system may generate an individually-manipulable volumetric model of the first object. For example, the virtual reality media provider system may generate the individually-manipulable volumetric model of the first object based on the captured depth data and the captured 2D video data from operation 1002. In certain examples, the individually-manipulable volumetric model of the first object may be configured to be individually manipulated with respect to an immersive virtual reality world while a user of a media player device is experiencing the immersive virtual reality world using the media player device. For example, the immersive virtual reality world may be based on virtual reality media content provided to the media player device and representative of the immersive virtual reality world. Operation 1006 may be performed in any of the ways described herein.

In operation 1008, the virtual reality media provider system may provide virtual reality media content representative of an immersive virtual reality world to a media player device associated with a user. Operation 1008 may be performed in any of the ways described herein.

In operation 1010, the virtual reality media provider system may individually manipulate the individually-manipulable volumetric model of the first object generated in operation 1006 within the virtual reality media content provided in operation 1008. For example, the virtual reality media provider system may individually manipulate the individually-manipulable volumetric model of the first object with respect to the immersive virtual reality world represented in the virtual reality media content. In some examples, the virtual reality media provider system may individually manipulate the individually-manipulable volumetric model of the first object while the user is experiencing the immersive virtual reality world use the media player device. Operation 1010 may be performed in any of the ways described herein.

Figure 11:
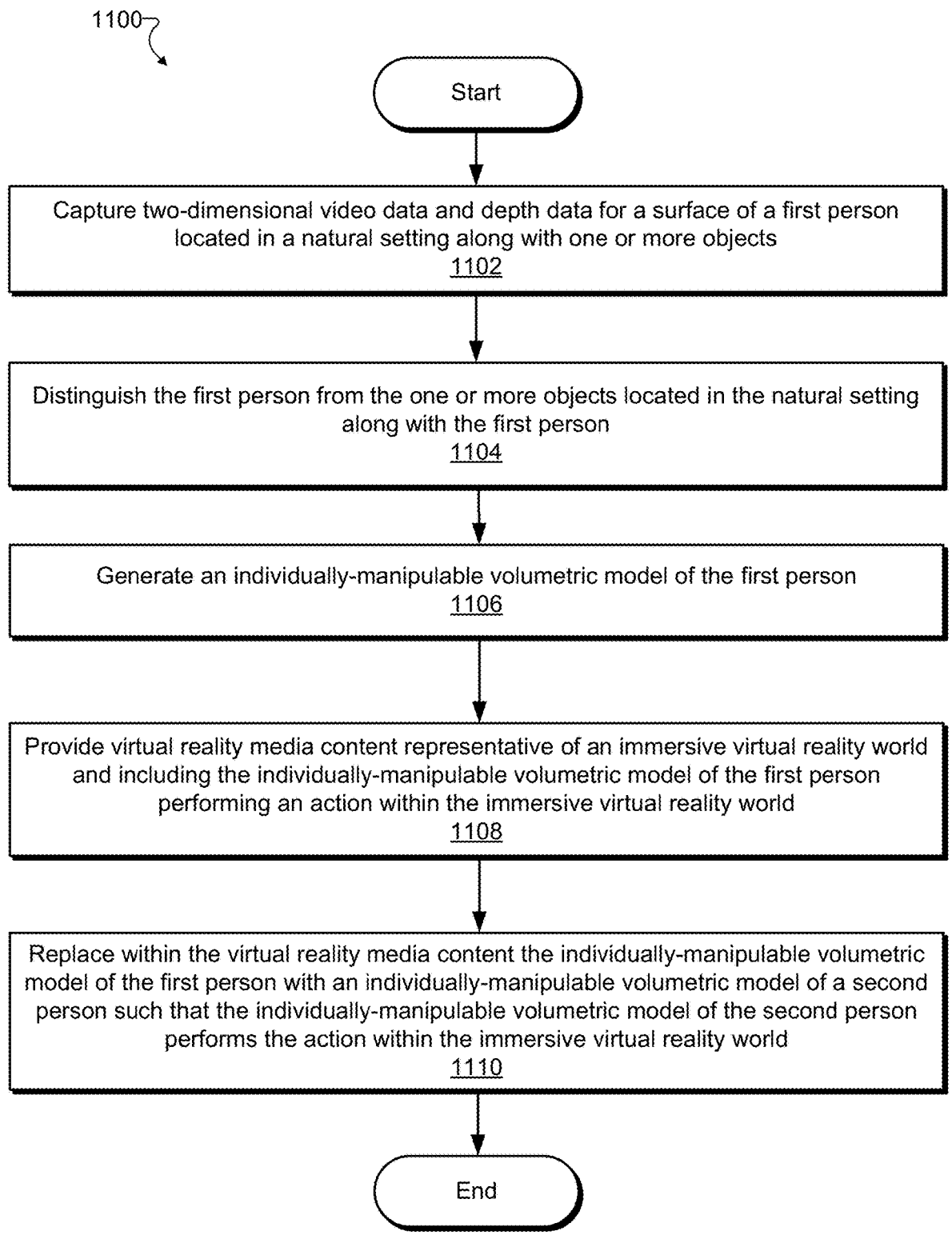

FIG. 11 illustrates an exemplary method 1100 for creating and manipulating an individually-manipulable volumetric model of an object located in a natural setting. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a virtual reality media provider system that includes a configuration of synchronous video and depth capture devices disposed at fixed positions in a vicinity of a first person may capture 2D video data and depth data for a surface of the first person. In some examples, the virtual reality media provider system may capture the 2D video data and depth data in real time and the first person may be located in a natural setting along with one or more objects. Operation 1102 may be performed in any of the ways described herein.

In operation 1104, the virtual reality media provider system may distinguish the first person from the one or more objects located in the natural setting along with the first person. For example, the virtual reality media provider system may distinguish the first person from the one or more objects based on the captured depth data and the captured 2D video data captured in operation 1102. In some examples, operation 1104 may be performed in real time. Operation 1104 may be performed in any of the ways described herein.

In operation 1106, the virtual reality media provider system may generate an individually-manipulable volumetric model of the first person. For example, operation 1106 may be performed based on the captured depth data and the captured 2D video data captured in operation 1102. In some examples, operation 1106 may be performed in real time. Operation 1106 may be performed in any of the ways described herein.

In operation 1108, the virtual reality media provider system may provide virtual reality media content representative of an immersive virtual reality world to a media player device associated with a user. For example, the virtual reality media content may include the individually-manipulable volumetric model of the first person generated in operation 1106 performing an action within the immersive virtual reality world. Operation 1108 may be performed in any of the ways described herein.

In operation 1110, the virtual reality media provider system may replace the individually-manipulable volumetric model of the first person with an individually-manipulable volumetric model of a second person within the virtual reality media content provided in operation 1108. For example, the virtual reality media provider system may replace the individually-manipulable volumetric model of the first person with the individually-manipulable volumetric model of the second person such that the individually-manipulable volumetric model of the second person performs the action performed by the individually-manipulable volumetric model of the first person in operation 1108 within the immersive virtual reality world while the user is experiencing the immersive virtual reality world using the media player device. In some examples, operation 1110 may be performed in real time. Operation 1110 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
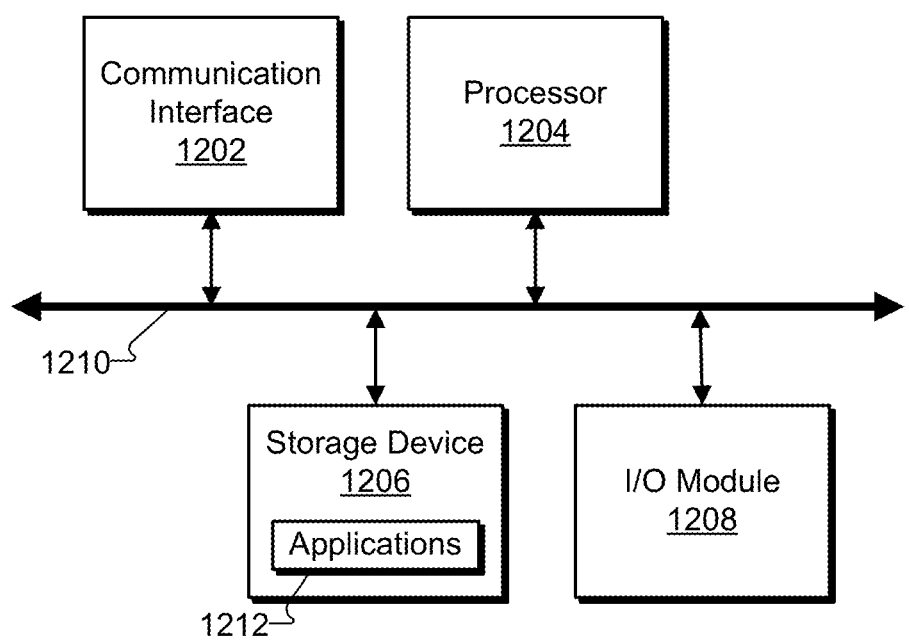
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with data capture facility 102, data processing facility 104, or data distribution facility 106 of system 100 (see FIG. 1). Likewise, storage facility 108 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a virtual reality media provider system, two-dimensional ("2D") video data and depth data for surfaces of a dynamic object and a static object located in a natural setting, the 2D video data and depth data captured by a first capture device and a second capture device disposed at different positions with respect to the dynamic and static objects;
distinguishing, by the virtual reality media provider system, the dynamic object from the static object by performing a plurality of techniques, the plurality of techniques including:
determining, based on the received 2D video data, that the dynamic object is moving in relation to the static object, and
determining, based on the received 2D video data, that, from a vantage point of at least one of the different positions at which the first and second capture devices are disposed, a representation of the dynamic object captured within the 2D video data does not overlap with a representation of the static object; and
generating and updating, by the virtual reality media provider system based on the received 2D video data and depth data and the distinguishing of the dynamic object from the static object, an individually-manipulable volumetric model of the dynamic object and an individually-manipulable volumetric model of the static object;
wherein:
the generating of the individually-manipulable volumetric model of the dynamic object includes capturing a behavior of the dynamic object and storing the captured behavior with the individually-manipulable volumetric model of the dynamic object for use in making an individually-manipulable volumetric model of an additional dynamic object that replaces the individually-manipulable volumetric model of the dynamic object perform the behavior of the dynamic object, and
the updating of the individually-manipulable volumetric model of the dynamic object is performed more regularly than the updating of the individually-manipulable volumetric model of the static object.

2. The method of claim 1, wherein the first and second capture devices are implemented as synchronous video and depth capture devices.

3. The method of claim 1, wherein the plurality of techniques further includes determining, based on the received depth data, that the dynamic object is located at least a predetermined distance away from the static object.

4. The method of claim 1, wherein the plurality of techniques further includes:
identifying, based on the received 2D video data, the dynamic object and the static object; and
determining, based on the identifying of the dynamic and static objects, that the dynamic object is different from the static object.

5. The method of claim 1, wherein:
the natural setting is a setting of a real-world event;
the different positions with respect to the dynamic and static objects where the first and second capture devices are disposed include a plurality of fixed positions surrounding the dynamic and static objects within the setting of the real-world event.

6. The method of claim 1, wherein:
the individually-manipulable volumetric model of the dynamic object is configured to be individually manipulated with respect to an immersive virtual reality world while a user of a media player device is experiencing the immersive virtual reality world using the media player device; and
the immersive virtual reality world is based on virtual reality media content provided to the media player device and representative of the immersive virtual reality world.

7. The method of claim 6, wherein the individually-manipulable volumetric model of the dynamic object is configured to be individually manipulated with respect to the immersive virtual reality world by inserting the individually-manipulable volumetric model of the dynamic object into the immersive virtual reality world at a particular location within the immersive virtual reality world.

8. The method of claim 6, wherein the individually-manipulable volumetric model of the dynamic object is configured to be individually manipulated with respect to the immersive virtual reality world by:
replacing the individually-manipulable volumetric model of the dynamic object included within the immersive virtual reality world with the individually-manipulable volumetric model of the additional dynamic object within the immersive virtual reality world; and
making the individually-manipulable volumetric model of the additional dynamic object perform the behavior of the dynamic object based on the captured behavior stored with the individually-manipulable volumetric model of the dynamic object.

9. The method of claim 6, wherein the individually-manipulable volumetric model of the dynamic object is configured to be individually manipulated with respect to the immersive virtual reality world by removing the individually-manipulable volumetric model of the dynamic object from the immersive virtual reality world.

10. A system comprising:
a first capture device disposed at a first position with respect to a dynamic object and a static object located in a natural setting, the first capture device configured to capture two-dimensional ("2D") video data and depth data for surfaces of the dynamic and static objects from the first position;
a second capture device disposed at a second position with respect to the dynamic and static objects, the second capture device configured to further capture the 2D video data and depth data for the surfaces of the dynamic and static objects from the second position;
a memory storing instructions; and
a processor communicatively coupled to the memory and to the first and second capture devices, the processor configured to execute the instructions to:

receive, from the first and second capture devices, the 2D video data and depth data for the surfaces of the dynamic and static objects;
distinguish the dynamic object from the static object by performing a plurality of techniques, the plurality of techniques including:
  determining, based on the received 2D video data, that the dynamic object is moving in relation to the static object, and
  determining, based on the received 2D video data, that, from a vantage point of at least one of the first and second positions, a representation of the dynamic object captured within the 2D video data does not overlap with a representation of the static object; and
generate and update, based on the received 2D video data and depth data and the distinguishing of the dynamic object from the static object, an individually-manipulable volumetric model of the dynamic object and an individually-manipulable volumetric model of the static object;
wherein:
  the generating of the individually-manipulable volumetric model of the dynamic object includes capturing a behavior of the dynamic object and storing the captured behavior with the individually-manipulable volumetric model of the dynamic object for use in making an individually-manipulable volumetric model of an additional dynamic object that replaces the individually-manipulable volumetric model of the dynamic object perform the behavior of the dynamic object, and
  the updating of the individually-manipulable volumetric model of the dynamic object is performed more regularly than the updating of the individually-manipulable volumetric model of the static object.

11. The system of claim 10, wherein the first and second capture devices are implemented as synchronous video and depth capture devices.

12. The system of claim 10, wherein the plurality of techniques further includes:
determining, based on the received depth data, that the dynamic object is located at least a predetermined distance away from the static object; and
identifying, based on the received 2D video data, the dynamic object and the static object and determining that the dynamic object is different from the static object.

13. The system of claim 10, wherein:
the natural setting is a setting of a real-world event;
the first and second positions with respect to the dynamic and static objects where the first and second capture devices are respectively disposed are fixed positions surrounding the dynamic and static objects within the setting of the real-world event.

14. The system of claim 10, wherein:
the individually-manipulable volumetric model of the dynamic object is configured to be individually manipulated with respect to an immersive virtual reality world while a user of a media player device is experiencing the immersive virtual reality world using the media player device; and
the immersive virtual reality world is based on virtual reality media content provided to the media player device and representative of the immersive virtual reality world.

15. The system of claim 14, wherein the individually-manipulable volumetric model of the dynamic object is configured to be individually manipulated with respect to the immersive virtual reality world by at least one of:
inserting the individually-manipulable volumetric model of the dynamic object into the immersive virtual reality world at a particular location within the immersive virtual reality world;
replacing the individually-manipulable volumetric model of the dynamic object included within the immersive virtual reality world with the individually-manipulable volumetric model of the additional dynamic object within the immersive virtual reality world and making the individually-manipulable volumetric model of the additional dynamic object perform the behavior of the dynamic object based on the captured behavior stored with the individually-manipulable volumetric model of the dynamic object; and
removing the individually-manipulable volumetric model of the dynamic object from the immersive virtual reality world.

16. A non-transitory computer-readable medium storing instructions that, when executed, direct a processor of a computing device to:
receive two-dimensional ("2D") video data for surfaces of a dynamic object and a static object located in a natural setting, the 2D video data and depth data captured by a first capture device and a second capture device disposed at different positions with respect to the dynamic and static objects;
distinguish the dynamic object from the static object by performing a plurality of techniques, the plurality of techniques including:
  determining, based on the received 2D video data, that the dynamic object is moving in relation to the static object, and
  determining, based on the received 2D video data, that, from a vantage point of at least one of the different positions at which the first and second capture devices are disposed, a representation of the dynamic object captured within the 2D video data does not overlap with a representation of the static object; and
generate and update, based on the received 2D video data and depth data and the distinguishing of the dynamic object from the static object, an individually-manipulable volumetric model of the dynamic object and an individually-manipulable volumetric model of the static object;
wherein:
  the generating of the individually-manipulable volumetric model of the dynamic object includes capturing a behavior of the dynamic object and storing the captured behavior with the individually-manipulable volumetric model of the dynamic object for use in making an individually-manipulable volumetric model of an additional dynamic object that replaces the individually-manipulable volumetric model of the dynamic object perform the behavior of the dynamic object, and
  the updating of the individually-manipulable volumetric model of the dynamic object is performed more regularly than the updating of the individually-manipulable volumetric model of the static object.

17. The non-transitory computer-readable medium of claim 16, wherein the first and second capture devices are implemented as synchronous video and depth capture devices.

18. The non-transitory computer-readable medium of claim 17, wherein the plurality of techniques further includes:
- determining, based on the received depth data, that the dynamic object is located at least a predetermined distance away from the static object; and
- identifying, based on the received 2D video data, the dynamic object and the static object and thereby determining that the dynamic object is different from the static object.

19. The non-transitory computer-readable medium of claim 16, wherein:
- the natural setting is a setting of a real-world event;
- the different positions with respect to the dynamic and static objects where the first and second capture devices are disposed include a plurality of fixed positions surrounding the dynamic and static objects within the setting of the real-world event.

20. The non-transitory computer-readable medium of claim 16, wherein:
- the individually-manipulable volumetric model of the dynamic object is configured to be individually manipulated with respect to an immersive virtual reality world while a user of a media player device is experiencing the immersive virtual reality world using the media player device; and
- the immersive virtual reality world is based on virtual reality media content provided to the media player device and representative of the immersive virtual reality world.

* * * * *